United States Patent [19]

Daniel et al.

[11] Patent Number: 5,201,056
[45] Date of Patent: Apr. 6, 1993

[54] RISC MICROPROCESSOR ARCHITECTURE WITH MULTI-BIT TAG EXTENDED INSTRUCTIONS FOR SELECTIVELY ATTACHING TAG FROM EITHER INSTRUCTION OR INPUT DATA TO ARITHMETIC OPERATION OUTPUT

[75] Inventors: Samuel M. Daniel; Brian K. Short, both of Tempe, Ariz.

[73] Assignee: Motorola, Inc., Schaumburg, Ill.

[21] Appl. No.: 517,865

[22] Filed: May 2, 1990

[51] Int. Cl.$^5$ .................. G06F 7/00; G06F 15/00
[52] U.S. Cl. .................. 395/800; 364/736; 364/736.5; 364/748; 364/258; 364/259.7; 364/259.8; 364/261.2; 364/244.8; 364/937.1; 364/946.9; 364/DIG. 1; 395/375
[58] Field of Search .......... 364/746, 749, 736.5, 364/736, 748; 395/375, 425, 800

[56] References Cited

U.S. PATENT DOCUMENTS

| | | | |
|---|---|---|---|
| 4,241,396 | 12/1980 | Mitchell et al. | 364/200 |
| 4,542,476 | 9/1985 | Nagafuji | 364/749 |
| 4,734,852 | 3/1988 | Johnson et al. | 364/200 |
| 4,766,566 | 8/1988 | Chuang | 364/900 |
| 4,789,957 | 12/1988 | Niehaus et al. | 364/749 |
| 4,841,436 | 6/1989 | Asano et al. | 364/200 |
| 4,890,253 | 12/1989 | Jabusch et al. | 364/736.5 |

FOREIGN PATENT DOCUMENTS 1-68829 3/1989 Japan .

Primary Examiner—Thomas C. Lee
Assistant Examiner—Ken S. Kim
Attorney, Agent, or Firm—Robert D. Atkins

[57] ABSTRACT

A RICS microprocessor architecture is provided with a plurality of data registers and instruction registers each having a multi-bit extension for extending the width of the data and instruction words processed therethrough. A first plurality of bits within a tag field of the multi-bit extension are reserved for identifying the data type of the data words while a second plurality of bits provide instruction dependent control. The multi-bit extension allows full precision computation for the data words requiring the tag field to identify the data type thereof while retaining full precision compatibility for data words not needing tag field identifiers. At least two bits of the first plurality of bits in tag field are reserved for identifying one of several primary categories of data types and at least two bits identify one of several subtype categories within each of the plurality of primary categories. An extended set of machine instructions is also provided for efficient usage of the multi-bit extension appended to the data and instruction registers.

13 Claims, 2 Drawing Sheets

RISC MICROPROCESSOR ARCHITECTURE WITH MULTI-BIT TAG EXTENDED INSTRUCTIONS FOR SELECTIVELY ATTACHING TAG FROM EITHER INSTRUCTION OR INPUT DATA TO ARITHMETIC OPERATION OUTPUT

CROSS REFERENCE TO RELATED PATENT APPLICATION

This application is related to U.S. Pat. No. 4,926,476, "METHOD AND APPARATUS FOR SECURE EXECUTION OF UNTRUSTED SOFTWARE", filed Feb. 3, 1989, by Carlin R. Covey and assigned to the same assignee, Motorola, Inc. The content thereof is hereby incorporated by reference.

BACKGROUND OF THE INVENTION

This invention relates in general to tag extensions for microprocessors, and more particularly, to the tag extension of a reduced instruction set computer (RISC) architecture for enhancing symbolic and numeric processing while maintaining backward compatibility without degrading execution performance.

Traditionally, RISC architectures have been viewed as unsuitable for symbolic processing languages such as Prolog, Scheme and Lisp. Programs written in Prolog, for example, comprise a sequence of procedural calls which greatly simplify the programming effort by separating the logic and control elements of the algorithms. A Prolog programmer may specify the high level logic of the problem and allow the compiler to define the control strategy to generate the executable code. Many of the compilers today convert the Prolog source code into Warren Abstract Machine (WAM) instructions which may then be executed on a conventional complex instruction set computer (CISC), such as the Motorola MC68030 microprocessor. However, symbolic languages tend to execute slowly on CISC machines due, in part, to the requirement that a data type must be assigned to the data words at run time rather than at compilation time, as is true for most non-symbolic languages such as Fortran, Pascal and C. A data type identifies the data word as an integer, floating point number, variable, list, etc.

For most if not all fifth generation languages such as Prolog, at least three bits are needed to support dynamic data type checking and related computations. Unfortunately, the typical 32-bit CISC architecture has no dedicated resource to handle the type tags of the data words. Consequently, for these machines to execute Prolog code, a 3-bit portion of the internal registers is reserved for the type designators leaving the remaining portion, say 29 bits of a 32-bit register, for storage of the integers and floating point number. This reduces the addressing range and the resolution of the data words. In order to regain the full 32-bit precision, the Prolog compiler must establish one register containing the data type tag as an indirect pointer to another register or memory location of the actual 32-bits of data. Since such full 32-bit operations occur frequently, the indirect pointers are inefficient and slow the execution speed of the microprocessor.

More recently, the RISC architecture has been considered for improving the symbolic and numeric processing of the Prolog language. The motivation in this direction is influenced by the simpler, more powerful instruction set offered by the RISC processor. Moreover, some RISC microprocessors such as Motorola's MC88100 include an on-board floating point unit which can enhance the otherwise poor numerical performance of the Prolog language. However, most if not all RISC microprocessors, including the MC88100, are fixed 32-bit machines and, therefore, must also allocate a portion of the internal registers for the data type tags when executing symbolic languages. Thus, the RISC microprocessor suffers from the same problem as the CISC counterpart in the inefficient handling of data type tags, yet it is still desirable to use the RISC machine for the reasons advanced above.

Hence, what is needed is an improved RISC microprocessor architecture which provides a dedicated resource for handling data type tags and includes an extended instruction set for effectively exploiting such a resource.

SUMMARY OF THE INVENTION

Accordingly, an objective of the present invention is to provide an improved RISC microprocessor architecture.

Another objective of the present invention is to provide an improved RISC microprocessor including a physical tag extension appended to the data registers and instruction registers.

Yet another objective of the present invention is to provide an improved RISC microprocessor, including additional machine instructions for exploiting the tag extensions appended to the data and instruction registers.

Still a further objective of the present invention is to provide an improved RISC microprocessor which supports memory operations for tagged data.

Still another objective of the present invention is to provide an improved RISC microprocessor, wherein the numeric operands may achieve the full precision of the data bus since the data type designation is stored in a tag extension appended thereto.

In accordance with the above and other objectives there is provided an improved RISC microprocessor architecture comprising a plurality of data registers and instruction registers each having a multi-bit extension for extending the width of the data and instruction words processed therethrough. The multi-bit extension comprises a tag field including a first plurality of bits reserved for identifying the data type and a second plurality of bits for instruction dependent control. The multi-bit extension allows full precision computation for the data words requiring a tag field to identify the data type thereof while retaining full precision compatibility for data words not needing tag field identifiers. At least two bits in the tag field are reserved for identifying one of several primary categories of data types, and at least two bits identify one of several subtype categories within each of the primary categories. The second plurality of bits for instruction dependent control include at least first and second bits which are set and tested independently for control of program execution of branching based on the results thereof.

In another aspect, the present invention comprises a microprocessor having a register file with a bi-directional port and first and second outputs and including a plurality of registers for storing data words therein. The data words include a full precision data portion and a tag field for identifying the data type thereof. The first output provides a separate data portion and tag field of a first data word while the second output provides a separate data portion and tag field of a second data word. A first computing circuit having first and second inputs is respectively coupled to the first and second outputs of the register file for performing arithmetic computation on the data portions of the first and second data words and providing a resulting data word having a data portion at a first output which is applied at the bi-directional port of the register file. An instruction register is coupled for receiving an instruction word from a memory location, wherein the instruction word includes a full precision instruction portion and a tag field, while a selector circuit is provided having a first input coupled for receiving the tag field of the instruction word stored in the instruction register and having a second input coupled for receiving the tag field of the first data word. The selector circuit provides, at an output, one of the tag fields applied at the first and second inputs, depending upon a control signal from the tag field of the instruction word. The tag field provided at the output is applied at the bi-directional port of the register file and combined with the data portion of the resulting data word of the first computing circuit for storage into the register file.

DETAILED DESCRIPTION OF THE PREFERRED EMBODIMENT

Figure 1:
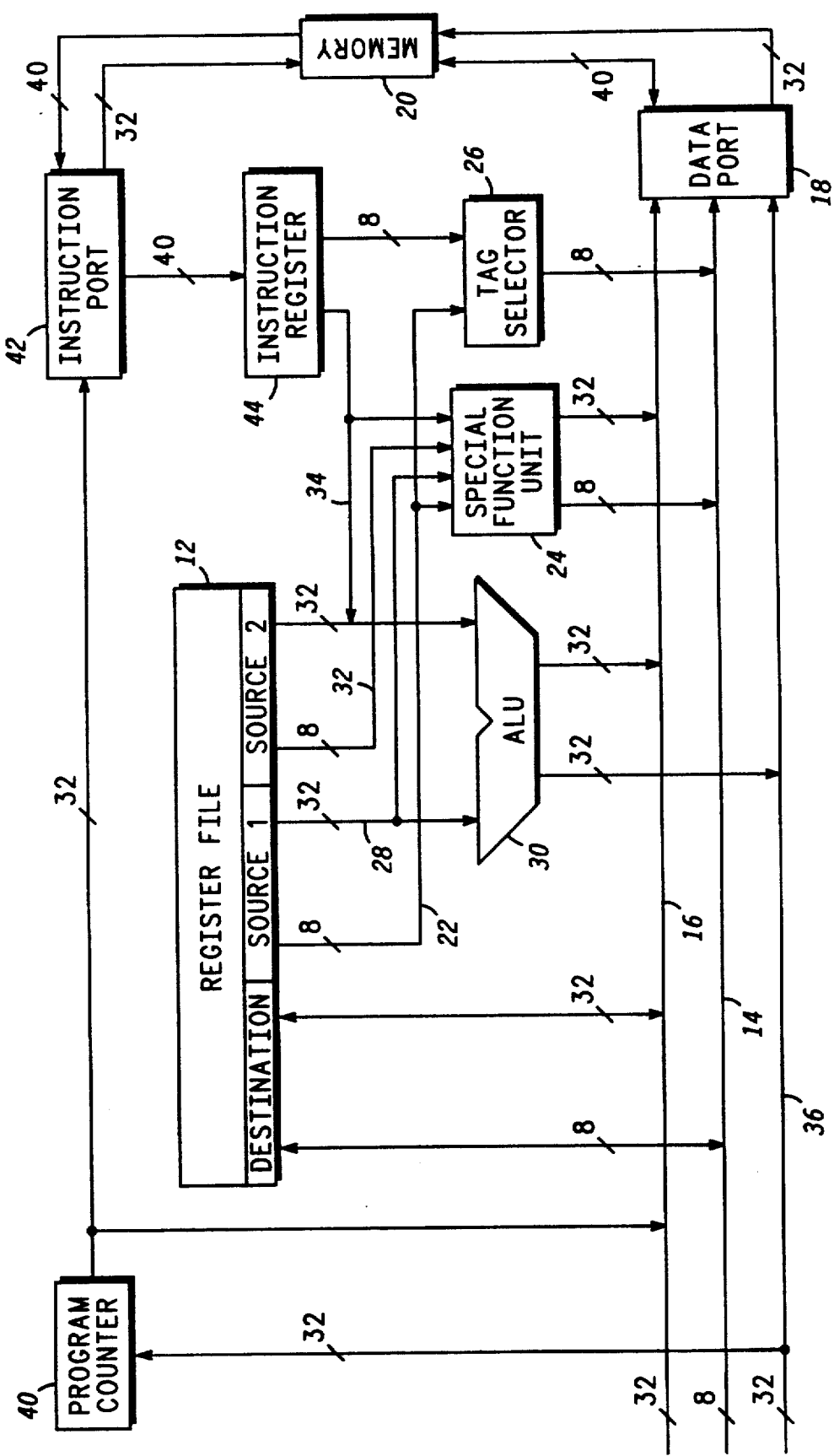
FIG. 1 is a block diagram illustrating the data flow in the preferred embodiment of the present invention.

The block diagram of RISC microprocessor 10 is shown in FIG. 1 as an improvement of the conventional Harvard architecture known for example in Motorola's MC88100 32-bit RISC microprocessor. It is understood that FIG. 1 is a simplified data flow diagram, hence, conventional features thereof not relevant to the disclosure of the present invent are not shown, but are well known to those working in the art and fully documented in the associated literature such as the technical reference manuals of the MC88100. When executing symbolic languages such as Prolog, data tags are required with the data word to identify the type thereof as integer, floating point, bound variable, etc, since these designations are assigned at run time rather than compilation time. The improvement comprises an 8-bit physical tag extension appended to the 32-bit registers thereby providing a 40-bit format for the data and instruction words. This allows the 32-bit portion of the register to accommodate full 32-bit precision values while providing a separate 8-bit field for the type tag. The 40-bit format also applies to the data busses, buffers, memory, etc., as necessary to support the extended registers. Moreover, the RISC instruction set is expanded for providing instructions which efficiently utilize the tag extension while maintaining backward compatibility to the standard instructions.

Referring to FIG. 1, RISC microprocessor 10 includes register file 12 having a DESTINATION input/output port and SOURCE 1 and SOURCE 2 output ports. Register file 12 comprises a plurality of 40-bit hard-wired registers, typically 32 in all, each of which is coupled for sending and receiving data from the DESTINATION input/output port and sending data to the SOURCE 1 and SOURCE 2 output ports. The DESTINATION input/output port is coupled through 8-bit tag bus 14 and 32-bit data bus 16 to data port 18 which provides buffering to memory 20 (also 40 bits wide). Data port 18 and memory 20 coupled together through a 40-bit bi-directional data bus for accommodating tag bus 14 and data bus 16. The SOURCE 1 output port is coupled through 8-bit tag bus 22 to special function unit (SFU) 24 and tag selector 26, and through 32-bit data bus 28 to arithmetic logic unit (ALU) 30 and SFU 24. The SOURCE 2 output port is coupled through 8-bit tag bus 32 to SFU 24, and through 32-bit data bus 34 to ALU 30 and SFU 24. The SOURCE 1 output port provides the SOURCE 1 operand, and the SOURCE 2 output port provides the SOURCE 2 operand. The first output of ALU 30 provides a 32-bit address word to address bus 36 and the second output of the same provides a 32-bit data word to data bus 16, while the 8-bit tag and 32-bit data word generated by SFU 24 are applied to tag bus 14 and data bus 16, respectively. Moreover, 32-bit address bus 36 is coupled to program counter 40 and through data port 18 to memory 20. The output of program counter 40 is coupled to data bus 16 and through instruction port 42 to memory 20. Instruction port 42 is also coupled for receiving a 40-bit instruction word (including an 8-bit tag) from memory 20 which is passed to 40-bit instruction register 44. Typically, several instruction registers are serially coupled for pipelining as is common in RISC architecture. The first output of instruction register 44 is coupled to data bus 34 for applying literals encoded within the 32-bit portion of the instruction word to the SOURCE 2 input of ALU 30. The second output of instruction register 44 is coupled to tag selector 26 for multiplexing either the SOURCE 1 tag from tag bus 22 or the instruction tag to tag bus 14 under control of bits 38-39 of the instruction word. Tag bus 14 and data bus 16 are bi-directional for sending and receiving data words between register file 12, ALU 30, SFU 24 and tag selector 26 and through data port 18 to memory 20.

Figure 2:
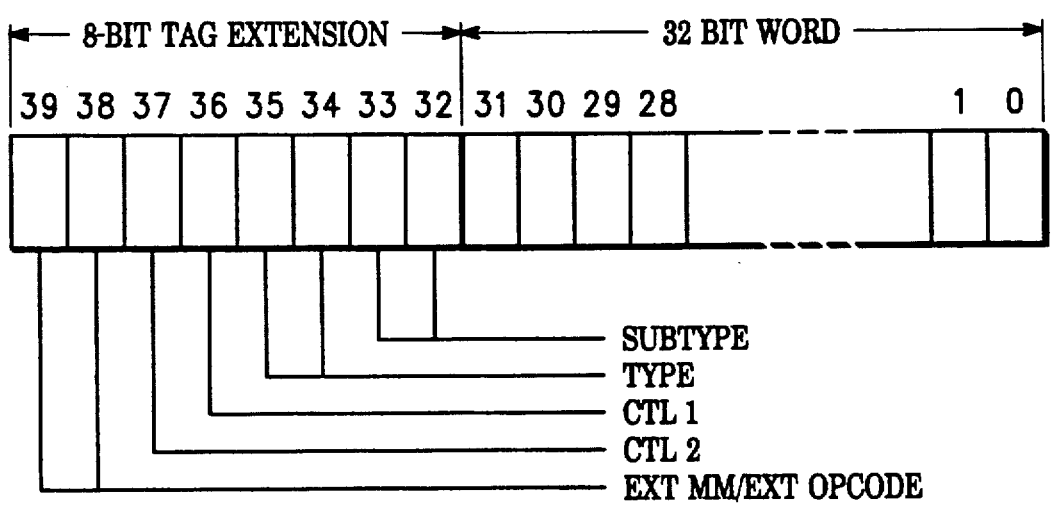
FIG. 2 is an illustration of a register including a physical tag extension.

Turning to FIG. 2, the 40-bit internal design of RISC microprocessor 10 is shown as register 50 including a 32-bit portion and an 8-bit tag extension. Register 50 is provided as a generic register and serves to illustrate both the data word format and the instruction word format, that is, the 32-bit portion may be assigned for full 32-bit precision data words and instruction words using conventional nomenclature. For example, if register 50 contains a data word, say a signed integer, then bits 0-30 store the integer representation and bit 31 is the sign. Likewise, a single precision floating point is stored with the mantissa in bits 0-22, the exponent in bits 23-30 and the sign in bit 31. Alternately, if register 50 contains an instruction word, say the ADD instruction, then bits 0-15 store the unsigned immediate operand, while bits 16-20 contain the source 1 register, bits 21-25 contain the destination register and bits 26-31 include the unique opcode identifier for the ADD instruction. Other instructions may define bits 0-25 of the instruction word differently as is understood.

The 8-bit tag extension of register 50 is a key feature of the present invention allowing the 32-bit portion thereof to provide full precision for the data and instruction words. Recall that for symbolic languages executing in prior art microprocessors, a portion of the 32-bit data word is reserved for the data type tag thereby reducing the addressing range and full 32-bit resolution of integer and floating point computations. In contrast, RISC microprocessor 10 provides an 8-bit physical tag extension of the instruction and data registers freeing the standard 32-bit portion thereof for full precision data and instruction processing.

The 8-bit tag extension is defined as follows: bits 39 and 38 are reserved for external memory management (EXT MM) and control of multi-processor synchronization for data registers; CTL2 (bit 37) and CTL 1 (bit 36) are instruction dependent tag control bits; bits 35 and 34 encode the primary type, and bits 33 and 32 encode the subtype as shown in Table 1.

TABLE 1

| Data type/subtype assignments | |
|---|---|
| Type/subtype | Assignment |
| type 00 | variable |
| subtype 00 | bound variable |
| subtype 01 | unbound variable |
| subtype 10 | user defined |
| subtype 11 | user defined |
| type 01 | constant |
| subtype 00 | symbol |
| subtype 01 | integer |
| subtype 10 | single precision floating point |
| subtype 11 | double precision floating point |
| type 10 | pair |
| subtype 00 | Prolog list |
| subtype 01 | user defined |
| subtype 10 | user defined |
| subtype 11 | user defined |
| type 11 | tuple |
| subtype 00 | Prolog structure |
| subtype 01 | user defined |
| subtype 10 | user defined |
| subtype 11 | user defined |

Altogether, bits 32 through 35 specify one of the sixteen unique data types well known and applicable in the Prolog language. For example, variable type are indirect pointers. Variable type is further defined as bound and unbound variable subtypes thereof. The pair type refers to list or cons subtypes of two logically connected memory locations, and the tuple type refers to structures or subtypes which are collections of logically connected memory elements. The constant type includes the well known symbol, integer and floating point formats. Several subtypes are left open for user defined options. It is understood that other language compilers may make entirely different data type assignments.

The 8-bit tag extension for the instruction word is similarly defined with one difference. Although bits 32-37 follow the previous definition, bits 39 and 38 identify the extended opcode (EXT OPCODE) for the instruction word. When bits 38-39 are zero, RISC microprocessor 10 executes the standard RISC instruction set for providing backward compatibility. When bits 38-39 are non-zero, instructions of the extended tag instruction set are executed.

An important aspect of the present invention is the addition of special tag instructions which exploit the capabilities of the physical tag extensions of the data and instruction words. The conventional RISC instruction set was not developed to support tag extensions and therefore cannot take full advantage of such features. The new instructions are disclosed in four major categories: Data Manipulation Instructions, Control Flow Instructions, Memory Operation Instructions and Floating Point Instructions.

A summary of the Data Manipulation Instructions is shown in Table 2 including integer arithmetic instructions which provide hardware support for addition, subtraction, comparison, multiplication and division. Also included are instructions to add with carry, subtract with borrow and manipulate 16-bit unsigned immediate values. The logical instructions support the AND, OR, exclusive-OR, and MASK logical operations allowing manipulation of the upper or lower 16-bits of 32-bit words independently.

TABLE 2

| Data Manipulation Instructions | | |
|---|---|---|
| Standard instruction | Tagged instruction | Nomenclature |
| ADD | TADD | Integer add |
| ADDU | TADDU | Unsigned integer add |
| SUB | TSUB | Integer subtract |
| SUBU | TSUBU | Unsigned integer subtract |
| AND | TAND | Logical and |
| MASK | TMASK | Logical mask |
| OR | TOR | Logical or |
| XOR | TXOR | Logical exclusive or |
| DIV | none | Integer divide |
| DIVU | none | Unsigned integer divide |
| MUL | none | Integer multiply |
| LDA | none | Load address |

The standard RISC instructions listed in the first column of Table 4 (ADD, ADDU, SUB, SUBU, AND, MASK, OR, XOR, DIV, DIVU, MUL, LDA) perform their respective operations on the 32-bit data word and retain the tag of the SOURCE 1 operand in the resulting data word. For example, consider the standard RISC ADD instruction which performs a signed integer addition and may have a format of "ADD RD, R1, 5", wherein the literal 5 is added to the contents of register R1 and the result is stored in register RD. The literal value 5 is provided in bits 0-15 of the instruction word. Referring to FIG. 1, the 40-bit ADD instruction is applied through instruction port 42 and loaded into instruction register 44. The literal 5 is passed through data bus 34 to the SOURCE 2 input of ALU 30 while the 40-bit data word of register R1 (8-bit tag and 32-bit integer) is applied to the SOURCE 1 output of register file 12. The 32-bit integer of register R1 is passed through data bus 28 to ALU 30 while the 8-bit tag of the same is applied at tag selector 26. The EXT OPCODE (bits 38-39) in the 8-bit tag field stored in instruction register 44 is "00" for the standard RISC ADD instruction. This causes tag selector 26 to propagate the 8-bit tag of the SOURCE 1 operand (tag value of register R1) through to tag bus 14 which is then applied to the DESTINATION input/output port of register file 12 along with the result of the addition of the literal 5 and the 32-bit integer from register R1 provided at the output of ALU 30 that is data bus 16. The combination of the 8-bit tag and 32-bit integer received at the DESTINATION input/output port is stored in 40-bit register RD. For a variation of the previous example, the value of the second operand may be received from register file 12 and applied through the SOURCE 2 output port to ALU 30.

The remaining instructions shown in the first column of Table 1 are processed similarly to the ADD instruction, the main difference being the operation performed within ALU 30 as is understood. See the Appendix for further details of the Data Manipulation Instructions. The important feature to note for the standard RISC instructions is that the tag field of the SOURCE 1 operand provided by register R1 is routed through tag selector 26 (EXT OPCODE = "00") and stored back as the tag identifier for the resulting data word placed in register RD. The tag field of the instruction word is not used except for the EXT OPCODE which controls tag selector 26. Hence, RISC microprocessor 10 is backwardly compatible with prior RISC designs such as the Motorola MC88100.

The tag instructions listed in the second column of Table 2 (TADD, TADDU, TSUB, TSUBU, TAND, TMASK, TOR, TXOR) are provided to support the physical tag extension of register 50. For example, consider the TADD instruction having a general format of "TADD INT | RD, R1, R2". The additional INT field is provided to redefine the tag type of the resulting data word stored in register RD. Using the previous example, the 40-bit add instruction including the literal 5 in bits 0–15 is loaded into instruction register 44 through instruction port 42 and passed through data bus 34 to the SOURCE 2 input of ALU 30, while the 40-bit data word of register R1 is applied to the SOURCE 1 output port of register file 12. The 32-bit integer of register R1 is passed through data bus 28 to ALU 30 and the 8-bit tag of the same is applied at tag selector 26. The EXT OPCODE (bits 38–39) in the 8-bit tag field stored in instruction register 44 is now "01" causing tag selector 26 to select the tag field of the instruction word (type=01 subtype=01, see Table 1) from the INT field of the instruction which is applied through tag bus 8 to the DESTINATION input/output port of register file 12 along with the result of the addition of the literal 5 and the 32-bit integer from register R1. The combination of the redefined 8-bit tag and 32-bit integer received at the DESTINATION input/output port is stored in register RD. The remaining instructions shown in the second column of Table 1 are processed similarly to the TADD instruction, the main difference being the operation performed within ALU 30. The important feature to note for the tagged RISC instructions is that the tag field of the instruction word is routed through tag selector 26 and stored back as the tag identifier for the resulting data word placed in register RD.

The standard RISC instruction set also includes Bit Field Instructions for extracting, setting, clearing, rotating, and making signed and unsigned tagged bit fields, see Table 3. The instruction word is defined by two 5-bit fields for providing the width and the offset concatenated as a single 10-bit field which may be specified as an immediate value or as the 10 least significant bits (LSB) of a general purpose register. A width of zero denotes an entire 32-bit word. The offset denotes the placement of the relevant bit field with respect to the LSB of the register containing the operand word. The Bit Field Operations set and clear bits in 32-bit words while retaining the tag of the SOURCE 1 operand in the results in a like manner as described for the standard RISC ADD instruction.

TABLE 3

| Bit Field Operations | |
|---|---|
| Instruction | Nomenclature |
| CLR | Clear bit field |
| SET | Set bit field |
| EXTU | Extract unsigned bit field |
| EXT | Extract signed bit field |
| MAK | Make bit field |
| ROT | Rotate register |
| FF1 | Find first bit set |
| FF0 | Find first bit clear |

The Control Flow Instructions shown in Table 4 provide conditional and unconditional branching based on the testing of particular data bits in a general purpose register. With the exception of the BSR and JSR instructions, the Control Flow Instructions are standard RISC instructions available for example in the MC88100 RISC instruction set. The Appendix provides additional detail for these instructions. For the BSR and JSR instructions, the 40-bit instruction word includes zeroes in the tag field and a 26-bit address offset for the program counter to which the program execution is passed. It is necessary to save the contents of the program counter in register R1 as the return address of the branch. Accordingly, the 32-bit value of the program counter is applied via data bus 16 to the DESTINATION input/output port of register file 12 for storage in register R1. The zero tag field of the instruction word is propagated through tag selector 26 and applied through tag bus 14 to the DESTINATION input/output port for storage in the tag extension of register R1. In addition, the value of the program counter is routed through register file 12 to the SOURCE 1 output port thereof to be combined with the 26-bit address offset provided by instruction register 44 through data bus 34 to the SOURCE 2 input of ALU 30. The resulting address is stored in program counter 40 by way of address bus 36. Upon return from the subroutine call, the contents of register R1 is reloading into program counter 40.

TABLE 4

| Control Flow Instructions | |
|---|---|
| Instruction | Nomenclature |
| BSR | Branch to subroutine |
| JSR | Jump to subroutine |
| JMP | Unconditional jump |
| BR | Unconditional branch |
| BCND | Conditional branch |
| TCND | Conditional trap |
| BB0 | Branch on bit clear |
| TB0 | Trap on bit clear |
| BB1 | Branch on bit set |
| TB1 | Trap on bit set |
| TBND | Trap on bounds check |
| RTE | Return from Exception |
| TBCND | Type conditional branch |
| SBCND | Subtype conditional branch |
| CMP | Compare tagged cells |
| TCMP | Tagged compare cells |

The last four Control Flow Instructions, TBCND, SBCND, CMP and TCMP, provide tag checking which can provide a significant improvement factor for symbolic programming languages that employ run time type checking. Explicit tag checking is supported using a combination of one and two-instruction branch schemes. One-instruction tag checking is provided by the type tagged conditional branch (TBCND) instruction and the subtype tagged conditional branch (SBCND) instruction. Similar to the standard BCND instruction, the TBCND and SBCND instructions encode a 16-bit address offset (bits 0–15) and a 5-bit field commonly known as the M5 field (bits 16–20) to specify the conditions for the delayed branch. The SOURCE 1 operand register reference is stored in bits 21–25 of the instruction word. The TBCND instruction is used to branch conditionally according to a combination of tag types, while the SBCND instruction branches conditionally according to a combination of tag subtypes. In the M5 field of the TBCND instruction, the rule is to check for tag type variable "00" in the SOURCE 1 operand upon setting bit 21; otherwise, check for tag type constant "01" if bit 22 is set, check for tag type list "10" if bit 23 is set, check for tag type structure "11" if bit 24 is set and check the CTL1 bit of the tag field if CTL1 bit 36 is set. Alternately for the SBCND instruction, the rule is to check for tag subtype "00" in the SOURCE 1 operand upon setting bit 21 of the M5 field; otherwise, check for tag subtype "01" if bit 22 is set, check for tag subtype "10" if bit 23 is set, check for tag subtype "11" if bit 24 is set and check the CTL2 bit of the tag field if CTL2 bit 37 is set.

For example, a valid TBCND instruction is "TBCND LIST, R2, 1000" which translates to check the type designator in the tag field of register R2 and branch to offset address 1000 if the type is list ("10" in bits 34–35, see Table 1). Furthermore, the TBCND and SBCND instructions may branch according to the settings of the CTL1 and CTL2 tag control bits, or combination thereof with the type and subtype fields. The instruction "TBCND CTL1+STRUCTURE, R2, 1000" says check the CTL1 bit and the type designator in the tag field of register R2 and branch to address 1000 if the CTL1 bit is set or the type is structure ("11" in bits 34–35). The SBCND instruction follows the explanation of the TBCND instruction except that the subtype bits 32–33 are tested instead of the type bits 34–35. Hence, combinations of bits in the M5 field of the instruction word may be set and cleared thereby allowing all resulting combinations to be encoded.

Although the TBCND and SBCND instructions provide a flexible and efficient means of examining tag bits of a single tagged data word, it is often necessary to compare two tagged data words. This is especially true for the Prolog language, wherein unification requires matching of terms which may include logical variables. Therefore, a set of conditions have been added to the standard RISC CMP instruction providing a powerful two-instruction tag and data checking mechanism. Five basic conditions have been added to the standard CMP instruction: TVEQ, TEQ, VAR1, VAR2, VAR12 in bits 16, 15, 14, 13, 12 and 11 of the instruction word, respectively. For an example instruction of "CMP R3, R4, R5", the R4 and R5 registers are compared for tag type and subtype and data word values. The TVEQ bit is set if the 2-bit subtype and 32-bit values match, and the TEQ bit is set if the 2-bit type and 2-bit subtype fields are equal. The VAR1 bit is set if the primary type of the data word in register R4 is variable type "00" and the VAR2 bit is set if the primary type of the data word in register R5 is variable type "00", while VAR12 is set if both are variable type "00". Note that the tag comparisons do not involve tag control bits CTL1 and CTL2, only the tag type and subtype bits. Since the CMP instruction affects only destination register RD and not the processor condition code bits, comparisons may be migrated away from the instructions that test the conditions, and their results retained in register file 12.

The TCMP instruction is similar to the standard CMP instruction, but allows encoding an immediate tag value in the instruction word. The immediate tag value serves as the SOURCE 2 operand tag value and is used in the comparison against the tag of the SOURCE 1 operand. The SOURCE 2 value of the TCMP instruction may be an immediate value or the value field of a specified register. This capability allows the direct comparison of frequently occurring patterns of various types. Consider an example instruction of "TCMP INT R3, R4, 5" which translates to compare the 40-bit data word in register R4 with the literal 5 and data type integer tag provided in the instruction word and set the compare bits TVEQ, TEQ, VAR1, VAR2, VAR12 accordingly.

The Memory Operation Instructions are provided for accessing 32-bit addressable memory space in byte addressed mode. Most address calculations are performed using a 32-bit register and a 16-bit immediate value or 32-bit register index. Since the tag bits are separated from the address bits they do not enter into the addressing calculation. This separation results in a zero-cycle tag deletion when addressing memory with tagged values.

TABLE 5

| Memory Operation Instructions | |
|---|---|
| Instruction | Nomenclature |
| LD | Load register |
| DRF | Dereference |
| DRFI | Dereference indirect |
| ST | Store register |
| TST | Tagged store |
| PUSH | Push value |
| PULL | Pull value |
| BIND | Bind value |
| XMEM | Exchange register with memory |

The Memory Operation Instruction are thoroughly discussed in the Appendix. Briefly, the LD instruction calculates a memory address and fetches the 40-bit data word including the 8-bit tag from memory for storage in register file 12. Dereferencing is an operation particularly prevalent in the Prolog language wherein a chain of reference pointers is followed to retrieve a value that is indirectly referenced. The DRF instruction is provided for retrieving values from such pointer chains. The tag type "00" is a bound variable identifying a continuing pointer chain, while tag type "00" subtype "01" is an unbound variable, or self-reference pointer indicating no further reference. The DRF instruction does not place an unbound pointer in a register. When the DRF instruction finds an unbound pointer at the end of a chain, the tag is replaced by a bound tag before placing the result value in the destination register. All other values found at the end of dereference chains are loaded into register file 12 unmodified. The DRFI forces one level of indirection, regardless of the initial tag value.

A large number of the instructions executed by a Prolog system reference memory 20. In general, RISC processors provide support for placing immediate data into registers, but do not support writing immediate data words to memory 20. Also, RISC processors do not usually supply stack manipulation instructions which automatically update stack pointers when storing values to memory. The instruction set includes four instructions, TST, PUSH, PULL and BIND which provide such features. The TST instruction encodes values of an immediate tag in the instruction word. The immediate tag value encoded is stored to memory along with the value contained in the destination register specified, resulting in a zero-cycle tag insertion. The address calculation of the TST instruction is identical to that of the ST instruction.

The PUSH instruction stores a register value in a predetermined memory location, but does not perform an effective address calculation. A specified register serves as the source of the effective address and as the destination of an incremented result which is computed. The PUSH instruction stores an immediate value encoded in the instruction word or the contents of a register specified and, therefore, provides an auto-increment addressing mode and an immediate addressing mode for storing frequently occurring short immediate data to memory. Conversely, the PULL instruction decrements a pointer and loads a memory value, saving the decremented pointer in the specified register and provides an auto-decrement addressing mode. The BIND instruction also allows storing an immediate tagged value encoded in the instruction word, but does not increment a pointer. This feature allows frequently occurring tagged immediate data encoded in the instruction word to be written to memory 20 in a single cycle.

The Floating Point Instructions are shown in Table 6 and fully discussed in the Appendix. Most of the Floating Point Instructions including FADD, FSUB, FDIV, FMUL, FLT operate on floating point operands and deliver floating point results. The rounding and truncating floating point instructions NINT, INT and TRNC provide integer results (type=01, subtype=01) with an implicit zero-cycle insertion tag operation. Notably, a control bit (FOP) is provided for the floating point control register. When set, the bit enables type checking on the tags of operands of the floating point instructions. All of the instructions accept floating point operands except the FLT instruction, which requires an integer (type=01, subtype=01). If an inappropriate tag value is encountered when the FOP bit is set, a Floating Point Operand Exception is taken.

TABLE 6

| Floating Point Instructions | |
|---|---|
| Instruction | Nomenclature |
| FADD | Floating point add |
| FSUB | Floating point subtract |
| FDIV | Floating point divide |
| FMUL | Floating point multiply |
| FCMP | Floating point compare |
| FLT | Convert integer to floating point |
| NINT | Floating point round to integer |
| INT | Floating point rounding mode to integer |
| TRNC | Floating point truncate to integer |

The floating point arithmetic operations are performed within SFU 24 which comprises a floating point unit as shown in FIG. 1. The SOURCE 1 and SOURCE 2 operands are applied to the inputs of SFU 24 for computation while the output tag and data word thereof is applied to tag bus 14 and data bus 16, respectively, for storage in register file 12.

The present invention also eliminates the overhead of type checking in evaluating arithmetic expressions through the use of Generic Arithmetic Instructions such as GADD, GSUB, GDIV, GMUL and GCUP as shown in Table 7 which support their respective operations on integer data, single precision floating point data, or a combination thereof.

TABLE 7

| Generic Arithmetic Instructions | |
|---|---|
| Instruction | Nomenclature |
| GADD | Generic add |
| GSUB | Generic subtract |
| GDIV | Generic divide |
| GMUL | Generic multiply |
| GCMP | Generic compare |

The Generic Arithmetic Instructions operate with two integer operands, two single precision floating point operands, and one integer and one single precision floating point combination of operands. The first two cases are relatively simple to handle. If both operands are integers, the result of a signed integer operation is produced along with an integer tag (type=01, subtype=01). If both operands are single precision floating point, the result of a single precision floating point operation is produced along with an integer tag (type=01, subtype=10). When one operand is integer and the other single precision floating point, the integer must first be converted to floating point format as in the FLT instruction after which the appropriate floating point operation is performed to produce the result which includes the appropriate tag. See the Appendix for further information.

Hence, what has been described is a novel RISC microprocessor architecture including a physical tag extension appended to the data and instruction registers and including extended machine instructions for exploiting the physical tag extensions which allows the operands to achieve the full precision of the data bus. The RISC microprocessor architecture includes a selector circuit for selecting between the tag field of the instruction word stored in the instruction register and the tag field of the first data word under control of the tag field of the instruction word. The selected tag field is combined with the data portion of the resulting data word from the arithmetic logic unit for storage into the register file.

By virtue of the multi-bit extension and the associated extended instruction set, the RISC microprocessor will provide enhanced symbolic and numeric computation performance. When the arithmetic logic unit is an onboard pipeline resource of the microprocessor, the numeric performance may be improved substantially over what is possible with fifth generation languages to data, such as Prolog, Scheme and Lisp.

APPENDIX: THE EXTENDED RISC INSTRUCTION SET

This Appendix provides a detailed description of the extended instruction set of the present invention. It is intended for use in conjunction with the technical reference manuals of Motorola's MC88100 RISC microprocessor. The assembly language for the RISC microprocessor allows for specifying a number of instruction options. For example, the execute next (.n) option can be attached to predetermined control transfer instructions for directing the sequencer to execute the instruction following the relevant instruction whether or not the control transfer is evoked. The complement (.c) option can be attached to some of the logical instructions and directs the execution unit to complement the source 2 operand before applying the relevant operation. The upper word (.u) option can also be attached to some of the logical operations for directing the execution unit to apply the relevant operation to the upper half word of the source register. Some of the instructions can be modified by attaching a size option. The byte (.b) option specifies that the relevant instruction should manipulate byte data. The unsigned byte (.bu) option specifies that the instruction should manipulate unsigned byte data. The half word option (.h) specifies that the operation should manipulate halfword (16-bit) data. The unsigned halfword option (.hu) specifies that the operation should manipulate unsigned halfword data. The double word (.d) option specifies that the instruction should manipulate double word (64-bit) data. The default size is one word (32-bit). The floating point instructions can manipulate any combination of single (s) and double (d) precision data. The size of relevant result and source operands must be specified in order using size options. Exceptions are provided for error conditions.

TABLE A-1

Relevant Notation for the Extended Instruction Set

| Notation | Description |
|---|---|
| rs1 | source 1 register specification |
| rs2 | source 2 register specification |
| rd | destination register specification |
| rsd | source and/or destination register |
| crs | control register source specification |
| crd | control register destination specification |
| crs/d | control register source and/or destination |
| off16 | 16-bit signed instruction offset from IP |
| off26 | 26-bit signed instruction offset from IP |
| lit16 | 16-bit literal (immediate) value |
| vec10 | 10-bit encoding of an exception vector |
| m5 | 5-bit condition match field |
| b5 | 5-bit unsigned integer denoting a bit number |
| o5 | 5-bit unsigned integer denoting a bit field offset |
| w5 | 5-bit unsigned integer denoting a bit field width |
| tag6 | 6-bit unsigned integer denoting a tag value |

ADD—Integer Add

The ADD instruction performs a signed integer addition. The value of the register specified by the rs1 field and the source 2 operand are combined using signed 32-bit two's complement addition. The source 2 operand may be either a 16-bit immediate value, which is zero extended to a full 32-bit equivalent, or a signed 32-bit register value. The carry-in (.ci) option specifies that the carry bit should be included in the operation. The carry-out option (.co) specifies that the carry generated by the operation should be placed in the carry bit. The carry-in-and-out option (.cio) specifies both carry-in and carry-out conditions. The resulting value of the addition is placed in the destination register specified by the rd field along with the tag of the source 1 operand.

| Addressing Modes: | add | rd, rs1, rs2 |
|---|---|---|
| | add.ci | rd, rs1, rs2 |
| | add.co | rd, rs1, rs2 |
| | add.cio | rd, rs1, rs2 |
| | add | rd, rs1, lit16 |
| Exceptions: | Integer Overflow | |

TADD—Tagged Integer Add

The TADD instruction performs a signed integer addition. The value of the register specified by the rs1 field and the source 2 operand value are combined using signed 32-bit two's complement addition. The source 2 operand may be either a 16-bit immediate value, which is zero extended to a full 32-bit equivalent, or a signed 32-bit register value. The carry-in (.ci) option specifies that the carry bit should be included in the operation. The carry-out option (.co) specifies that the carry generated by the operation should be placed in the carry bit. The carry-in-and-out option (.cio) specifies both carry-in and carry-out conditions. The result of the addition is placed in the destination register specified by the rd field along with the immediate tag specified by the tag6.

| Addressing Modes: | tadd | tag6 | rd, rs1, rs2 |
|---|---|---|---|
| | tadd.ci | tag6 | rd, rs1, rs2 |
| | tadd.co | tag6 | rd, rs1, rs2 |
| | tadd.cio | tag6 | rd, rs1, rs2 |
| | tadd | tag6 | rd, rs1, lit16 |
| Exceptions: | Integer Overflow | | |

ADDU—Unsigned Integer Add

The ADDU instruction performs an unsigned integer addition. The value of the register specified by the rs1 field and the source 2 operand are combined using unsigned 32-bit two's complement addition. The source 2 operand may be a 16-bit immediate value which is zero extended to a fully thirty two bits, or an unsigned 32-bit register value. The carry in (.ci) option specifies that the carry bit should be included in the operation. The carry out option (.co) specifies that the carry generated by the operation should be placed in the carry bit. The carry in and out option (.cio) specifies both carry in and carry out. The result of the addition and the tag of source 1 operand are placed in the destination register specified by the rd field.

| Addressing Modes: | addu | rd, rs1, rs2 |
|---|---|---|
| | addu.ci | rd, rs1, rs2 |
| | addu.co | rd, rs1, rs2 |
| | addu.cio | rd, rs1, rs2 |
| | addu | rd, rs1, lit16 |
| Exceptions: | Integer Overflow | |

TADDU—Tagged Unsigned Integer Add

The TADDU instruction performs an unsigned integer addition. The value of the register specified by the rs1 field and the source 2 operand value are combined using unsigned 32-bit two's complement addition. The source 2 operand value may be a 16-bit immediate value which is zero extended to a full thirty two bits, or an unsigned 32-bit register value. The carry in (.ci) option specifies that the carry bit should be included in the operation. The carry out option (.co) specifies that the carry generated by the operation should be placed in the carry bit. The carry in and out option (.cio) specifies both carry in and carry out. The result of the addition is placed in the destination register specified by the rd field along with the immediate tag specified by the tag6 field.

| Addressing Modes: | taddu | tag6 | rd, rs1, rs2 |
|---|---|---|---|
| | taddu.ci | tag6 | rd, rs1, rs2 |
| | taddu.co | tag6 | rd, rs1, rs2 |
| | taddu.cio | tag6 | rd, rs1, rs2 |
| | taddu | tag6 | rd, rs1, lit16 |
| Exceptions: | Integer Overflow | | |

SUB—Integer Subtract

The SUB instruction performs a signed integer subtraction. The source 2 operand is subtracted from the value of the register specified by the rs1 field using signed 32-bit two's complement subtraction. The source 2 operand may be a 16-bit immediate value which is sign extended to a full thirty two bits, or a signed 32-bit register value. The carry in (.ci) option specifies that the carry bit should be included in the operation. The carry out option (.co) specifies that the carry generated by the operation should be placed in the carry bit. The carry in and out option (.cio) specifies both carry in and carry out. The result of the substraction and the tag of the source 1 operand are placed in the destination register specified by the rd field.

| Addressing Modes: | sub | rd, rs1, rs2 |
|---|---|---|
| | sub.ci | rd, rs1, rs2 |
| | sub.co | rd, rs1, rs2 |
| | sub.cio | rd, rs1, rs2 |
| | sub | rd, rs1, lit16 |
| Exceptions: | Integer Overflow | |

TSUB—Tagged Integer Subtract

The TSUB instruction performs a signed integer subtraction. The source 2 operand value is subtracted from the value of the register specified by the rs1 field using signed 32-bit two's complement subtraction. The source 2 operand value may be a 16-bit immediate value which is sign extended to a full thirty two bits, or a signed 32-bit register value. The carry in (.ci) option specifies that the carry bit should be included in the operation. The carry out option (.co) specifies that the carry generated by the operation should be placed in the carry bit. The carry in and out option (.cio) specifies both carry in and carry out. The result of the subtraction is placed in the destination register specified by the rd field along with the immediate tag specified by the tag6 field.

| Addressing Modes: | tsub | tag6 \| rd, rs1, rs2 |
|---|---|---|
| | tsub.ci | tag6 \| rd, rs1, rs2 |
| | tsub.co | tag6 \| rd, rs1, rs2 |
| | tsub.cio | tag6 \| rd, rs1, rs2 |
| | tsub | tag6 \| rd, rs1, lit16 |
| Exceptions: | Integer Overflow | |

SUBU—Unsigned Integer Subtract

The SUBU instruction performs an unsigned integer subtraction. The source 2 operand is subtracted from the the value of the register specified by the rs1 field using unsigned 32-bit two's complement subtraction. The source 2 operand may be an unsigned 16-bit immediate value which is zero extended to a full thirty two bits, or an unsigned 32-bit register value. The carry in (.ci) option specifies that the carry bit should be included in the operation. The carry out option (.co) specifies that the carry generated by the operation should be placed in the carry bit. The carry in and out option (.cio) specifies both carry in and carry out. The result of the subtraction and the tag of the source 1 operand are placed in the destination register specified by the rd field.

| Addressing Modes: | subu | rd, rs1, rs2 |
|---|---|---|
| | subu.ci | rd, rs1, rs2 |
| | subu.co | rd, rs1, rs2 |
| | subu.cio | rd, rs1, rs2 |
| | subu | rd, rs1, lit16 |
| Exceptions: | Integer Overflow | |

TSUBU—Tagged Unsigned Integer Subtract

The TSUBU instruction performs an unsigned integer subtraction. The source 2 operand value is subtracted from the value of the register specified by the rs1 field using unsigned 32-bit two's complement subtraction. The source 2 operand value may be an unsigned 16-bit immediate value which is zero extended to a full thirty two bits, or an unsigned 32-bit register value. The carry in (.ci) option specifies that the carry bit should be included in the operation. The carry out option (.co) specifies that the carry generated by the operation should be placed in the carry bit. The carry in and out option (.cio) specifies both carry in and carry out. The result of the subtraction is placed in the destination register specified by the rd field along with the immediate tag specified by the tag6 field.

| Addressing Modes: | tsubu | tag6 \| rd, rs1, rs2 |
|---|---|---|
| | tsubu.ci | tag6 \| rd, rs1, rs2 |
| | tsubu.co | tag6 \| rd, rs1, rs2 |
| | tsubu.cio | tag6 \| rd, rs1, rs2 |
| | tsubu | tag6 \| rd, rs1, lit16 |
| Exceptions: | Integer Overflow | |

AND—Logical And

The AND instruction performs a logical and operation. The value of the register specified by the rs1 field and the value of the register specified by the rs2 field are logically "and-ed" bitwise. If the complement (.c) option is specified, the source 2 operand is logically negated bitwise before the operation. The result of the operation and the tag of the source 1 operand are placed in the destination register specified by the rd field.

| Addressing Modes: | and[.c] | rd, rs1, rs2 |
|---|---|---|
| Exceptions: | none | |

AND—Logical And Immediate

The AND instruction performs a logical and operation. The value of the register specified by the rs1 field and the source 2 operand are logically "and-ed" bitwise. The source 2 operand is an unsigned 16-bit immediate value. If the upper word (.u) option is specified, the upper sixteen bits of the source operand are "and-ed" and the lower sixteen bits remain unaffected. Otherwise, the lower sixteen bits are "and-ed" and the upper sixteen bits remain unaffected. The result of the operation and the tag of the source 1 operand are placed in the destination register specified by the rd field.

| Addressing Modes: | and[.u] | rd, rs1, lit16 |
|---|---|---|
| Exceptions: | none | |

TAND—Tagged Logical And Immediate

The TAND instruction performs a logical and operation. The value of the register specified by the rs1 field and the source 2 operand value are logically "and-ed" bitwise. The source 2 operand is an unsigned 16-bit immediate value. If the upper word (.u) option is specified, the upper sixteen bits of the source operand are "and-ed" and the lower sixteen bits remain unaffected. Otherwise, the lower sixteen bits are "and-ed" and the upper sixteen bits remain unaffected. The result of the operation is placed in the destination register specified by the rd field along with the immediate tag specified by the tag6 field.

| Addressing Modes: | tand[.u] | tag6 \| rd, rs1, lit16 |
|---|---|---|

TAND—Tagged Logical And

The TAND instruction performs a logical and operation. The value of the register specified by the rs1 field and the value of the register specified by the rs2 field are logically "and-ed" bitwise. If the complement (.c) option is specified, the source 2 operand value is logically negated bitwise before the operation. The result of the operation is placed in the destination register specified by the rd field along with the immediate tag specified by the tag6 field.

| Addressing Modes: | tand[.c]  tag6 \| rd, rs1, rs2 |
|---|---|
| Exceptions: | none |

MASK—Logical Mask Immediate

The MASK instruction performs a logical and operation. The value of the register specified by the rs1 field and the source 2 operand are logically "and-ed" bitwise. The source 2 operand is an unsigned 16-bit immediate value. If the upper word (.u) option is specified, the upper sixteen bits of the source operand are "and-ed" and the lower sixteen bits are cleared. Otherwise, the lower sixteen bits are "and-ed" and the upper sixteen bits are cleared. The result of the operation and the tag of the source 1 operand are placed in the destination register specified by the rd field.

| Addressing Modes: | mask[.u]  rd, rs1, lit16 |
|---|---|
| Exceptions: | none |

TMASK—Tagged Logical Mask Immediate

The TMASK instruction performs a logical and operation. The value of the register specified by the rs1 field and the source 2 operand value are logically "and-ed" bitwise. The source 2 operand is an unsigned 16-bit immediate value. If the upper word (.u) option is specified, the upper sixteen value bits of the source operand are "and-ed" and the lower sixteen bits are cleared. Otherwise, the lower sixteen bits are "and-ed" and the upper sixteen bits are cleared. The result of the operation is placed in the destination register specified by the rd field along with the immediate tag specified by the tag6 field.

| Addressing Modes: | tmask[.u]  tag6 \| rd, rs1, lit16 |
|---|---|
| Exceptions: | none |

OR—Logical Or

The OR instruction performs a logical or operation. The value of the register specified by the rs1 field and the value of the register specified by the rs2 field are logically "or-ed" bitwise. If the complement (c) option is specified, the source 2 operand is logically negated bitwise before the operation. The result of the operation and the tag of the source 1 operand are placed in the destination register specified by the rd field.

| Addressing Modes: | or[.c]  rd, rs1, rs2 |
|---|---|
| Exceptions: | none |

TOR—Tagged Logical Or

The TOR instruction performs a logical "or" operation. The value of the register specified by the rs1 field and the value of the register specified by the rs2 field are logically "or-ed" bitwise. If the complement (.c) option is specified, the source 2 operand value is logically negated bitwise before the operation. The result of the operation is placed in the destination register specified by the rd field along with the immediate tag specified by the tag6 field.

| Addressing Modes: | tor[.c]  tag6 \| rd, rs1, rs2 |
|---|---|
| Exceptions: | none |

OR—Logical Or Immediate

The OR instruction performs a logical "or" operation. The value of the register specified by the rs1 field and the source 2 operand are logically "or-ed" bitwise. The source 2 operand is an unsigned 16-bit immediate value. If the upper word (.u) option is specified, the upper sixteen bits of the source operand are "or-ed" and the lower sixteen bits remain unaffected. Otherwise, the lower sixteen bits are "or-ed" and the upper sixteen bits remain unaffected. The result of the operation and the tag of the source 1 operand are placed in the destination register specified by the rd field.

| Addressing Modes: | or[.u]  rd, rs1, lit16 |
|---|---|
| Exceptions: | none |

TOR—Tagged Logical Or Immediate

The TOR instruction performs a logical "or" operation. The value the register specified by the rs1 field and the source 2 operand value are logically "or-ed" bitwise. The source 2 operand is an unsigned 16-bit immediate value. If the upper word (.u) option is specified, the upper sixteen value bits of the source operand are "or-ed" and the lower sixteen bits remain unaffected. Otherwise, the lower sixteen bits are "or-ed" and the upper sixteen bits remain unaffected. The result of the operation is placed in the destination register specified by the rd field along with the immediate tag specified by the tag6 field.

| Addressing Modes: | tor[.u]  tag6 \| rd, rs1, lit16 |
|---|---|
| Exceptions: | none |

XOR—Logical Exclusive Or

The XOR instruction performs a logical exclusive-or operation. The value of the register specified by the rs1 field and the value of the register specified by the rs2 field are logically "exclusive or-ed" bitwise. If the complement (.c) option is specified, the source 2 operand is logically negated bitwise before the operation. The result of the operation and the tag of the source 1 operand are placed in the destination register specified by the rd field.

| Addressing Modes: | xor[.c] rd, rs1, rs2 |
|---|---|
| Exceptions: | none |

TXOR—Tagged Logical Exclusive Or

The TXOR instruction performs a logical exclusive-or operation. The value of the register specified by the rs1 field and the value of the register specified by the rs2 field are logically "exclusive or-ed" bitwise. If the complement (.c) option is specified, the source 2 operand is logically negated bitwise before the operation. The result of the operation is placed in the destination register specified by the rd field along with the immediate tag specified by the tag6 field.

| Addressing Modes: | txor[.c] tag6 \| rd, rs1, rs2 |
|---|---|
| Exceptions: | none |

XOR—Logical Exclusive Or Immediate

The XOR instruction performs a logical exclusive-or operation. The value of the register specified by the rs1 field and the source 2 operand are logically "exclusive or-ed" bitwise. The source 2 operand is an unsigned 16-bit immediate value. If the upper word (.u) option is specified, the upper sixteen bits of the source operand are "exclusive or-ed" and the lower sixteen bits remain unaffected. Otherwise, the lower sixteen bits are "exclusive or-ed" and the upper sixteen bits remain unaffected. The result of the operation and the tag of the source 1 operand are placed in the destination register specified by the rd field.

| Addressing Modes: | xor[.u] rd, rs1, lit16 |
|---|---|
| Exceptions: | none |

TXOR—Tagged Logical Exclusive Or Immediate

The TXOR instruction performs a logical exclusive-or operation. The value of the register specified by the rs1 field and the source 2 operand value are logically "exclusive or-ed" bitwise. The source 2 operand is an unsigned 16-bit immediate value. If the upper word (.u) option is specified, the upper sixteen value bits of the source operand are "exclusive or-ed" and the lower sixteen bits remain unaffected. Otherwise, the lower sixteen bits are "exclusive or-ed" the upper sixteen bits remain unaffected. The result of the operation is placed in the destination register specified by the rd field along with the immediate tag specified by the tag6 field.

| Addressing Modes: | txor[.u] tag6 \| rd, rs1, lit16 |
|---|---|
| Exceptions: | none |

DIV—Integer Divide

The DIV instruction performs an signed integer division. The the value of the register specified by the rs1 field is divided by the source 2 operand using signed 32-bit two's complement division. The quotient and the tag of the source 1 operand are stored in the destination register specified by the rd field. The source 2 operand may be a signed 16-bit immediate value which is sign extended to a full 32 bits, or a signed 32-bit register value. If the divisor is zero, the division by zero exception is signaled and program control is transferred to the divide zero exception handler.

| Addressing Modes: | div rd, rs1, rs2 |
|---|---|
|  | div rd, rs1, lit16 |
| Exceptions: | Integer Divide by Zero |

DIVU—Unsigned Integer Division

The DIVU instruction performs an unsigned integer division. The the value of the register specified by the rs1 field is divided by the source 2 operand using unsigned 32-bit two's complement division. The quotient and the tag of the source 1 operand are stored in the destination register specified by the rd field. The source 2 operand may be an unsigned 16-bit immediate value which is zero extended to a full 32 bits, or an unsigned 32-bit register value. If the divisor is zero, the division by zero exception is signaled and program control is transferred to the divide by zero exception handler.

| Addressing Modes: | divu rd, rs1, rs2 |
|---|---|
|  | divu rd, rs1, lit16 |
| Exceptions: | Integer Divide by Zero |

MUL—Integer Multiply

The MUL instruction performs an unsigned integer multiplication. The value of the register specified by the rs1 field and the source 2 operand are multiplied using unsigned 32-bit two's complement multiplication. The source 2 operand may be a 16-bit immediate value which is zero extended to a full thirty two bits, or an unsigned 32-bit register value. The least significant thirty two bits of the product and the tag of the source 1 operand are placed in the destination register specified by the rd field.

| Addressing Modes: | mul rd, rs1, rs2 |
|---|---|
|  | mul rd, rs1, lit16 |
| Exceptions: | none |

LDA—Load Address

The LDA instruction performs an unsigned integer addition and address scaling operation. The value of the register specified by the rs1 field and the scaled value of the register specified by the rs2 field are combined using unsigned 32-bit two's complement addition. The source 2 operand is scaled by the size of the access specified in the TY field (byte=11, halfword=10, word=01, double word=00). The result of the addition and the tag of the source 1 operand are placed in the destination register specified by the rd field.

| Addressing Modes: | lda.b rd, rs1[rs2] |
|---|---|
|  | lda.h rd, rs1[rs2] |
|  | lda rd, rs1[rs2] |
|  | lda.d rd, rs1[rs2] |
| Exceptions: | none |

CLR—Clear Bit Field

The CLR instruction clears a bit field. The value of the register specified by the rs1 field is placed in the destination register specified by the rd field with the bit field specified by the source 2 operand cleared. The destination register always receives the tag of the source 1 operand. The source 2 operand specified an offset and width and may be encoded as either a 10-bit immediate or as the least significant ten bits of the register specified by the rs2 field. The offset specifies the least significant bit of the bit field and the width specifies the total number of bits to be included in the bit field.

| Addressing Modes: | clr | rd, rs1, w5<o5> |
|---|---|---|
|  | clr | rd, rs1, rs2 |
| Exceptions: | none |  |

SET—Set Bit Field

The SET instruction sets a bit field. The value of the register specified by the rs1 field is placed in the register specified by the rd field with the bit field specified by the source 2 operand set to ones. The destination register always receives the tag of the source 1 operand. The source 2 operand specifies an offset and width and may be encoded as either a 10-bit immediate or as the least significant ten bits of the register specified by the rs2 field. The offset specifies the least significant bit of the bit field and the width specifies the total number of bits to be included in the bit field.

| Addressing Modes: | set | rd, rs1, w5<o5> |
|---|---|---|
|  | set | rd,rs1, rs2 |
| Exceptions: | none |  |

EXTU—Extract Unsigned Bit Field

The EXTU instruction extracts an unsigned bit field. The bit field specified by the source 2 operand is extracted from the register specified by the rs1 field and placed in the least significant bit positions of the register specified by the rd field. The destination register always receives the tag of the source 1 operand. The result is not sign extended and all bits extracted from outside a register boundary are set to zero. The source 2 operand specifies an offset and width, and may be encoded as either a 10-bit immediate or as the least significant ten bits of the register specified by the rs2 field. The offset specifies the least significant bit of the bit field and the width specifies the total number of bits to be included in the bit field. When the width field contains all zeros, the instruction is equivalent to a logical shift right instruction.

| Addressing Modes: | extu | rd, rs1, w5<o5> |
|---|---|---|
|  | extu | rd,rs1, rs2 |
| Exceptions: | none |  |

EXT—Extract Signed Bit Field

The EXT instruction extracts a signed bit field. The bit field specified by the source 2 operand is extracted from the register specified by the rs1 field and placed in the least significant bit positions of the register specified by the rd field. The result is sign extended using the most significant bit of the source bit field. All bits extracted from outside a register boundary are set to zero. The destination register always receives the tag of the source 1 operand. The source 2 operand specifies an offset and width, and may be encoded as either a 10-bit immediate or as the least significant ten bits of the register specified by the rs2 field. The offset specifies the least significant bit of the bit field and the width specifies the total number of bits to be included in the bit field. When the width field contains all zeros, the instruction is equivalent to an arithmetic shift right instruction.

| Addressing Modes: | ext | rd, rs1, w5<o5> |
|---|---|---|
|  | ext | rd,rs1, rs2 |
| Exceptions: | none |  |

MAK—Make Bit Field

The MAK instruction creates an unsigned bit field. The least significant bits specified by the source 2 operand width field are extracted from the register specified by the rs1 field and placed in the position specified by the offset field in the register specified by the rd field. All bits outside of the bit field are set to zero. The destination register always receives the tag of the source 1 operand. The source 2 operand specifies the offset and width, and may be encoded as either a 10-bit immediate or as the least significant ten bits of the register specified by the rs2 field. When the width field contains all zeros, the instruction is equivalent to a shift left instruction.

| Addressing Modes: | mak | rd, rs1, w5 <o5> |
|---|---|---|
|  | mak | rd,rs1, rs2 |
| Exceptions: | none |  |

ROT—Rotate Register

The ROT instruction rotates the bits of a register. The bits from the register specified by the rs1 field are rotated right by the number of bits specified by the offset field of the source 2 operand. The destination register always receives the tag of the source 1 operand. The source 2 operand specifies the offset and width, and may be encoded as either a 10-bit immediate or as the least significant ten bits of the register specified by the rs2 field. The width field must contain all zeros to prevent unpredictable results.

| Addressing Modes: | rot | rd, rs1, w5<o5> |
|---|---|---|
|  | rot | rd,rs1, rs2 |
| Exceptions: | none |  |

FF1—Find First Bit Set

The FF1 instruction finds the most significant set bit in a register. The bits from the register specified by the rs1 field are examined starting with the most significant. The bit number of the first set bit found is placed in the register specified by the rd field. If no bits are set in the source register, the destination register will contain 32. The destination register always receives the tag of the source 1 operand.

| Addressing Modes: | ff1  | rd, rs2 |
|---|---|---|
| Exceptions: | none | |

FF0—Find First Bit Clear

The FF0 instruction finds the most significant clear bit in a register. The bits from the register specified by the rs1 field are examined starting with the most significant. The bit number of the first clear bit found is placed in the register specified by the rd field. If no bits are clear in the source register, the destination register will contain 32. The destination register always receives the tag of the source 1 operand.

| Addressing Modes: | ff0  | rd, rs2 |
|---|---|---|
| Exceptions: | none | |

BSR—Branch to Subroutine

The BSR instruction is an unconditional branch that saves the return address in register r1. The return address is defined by adding 4 bytes to the address of the BSR instruction, or by adding 8 bytes to the address of the BSR.n instruction. The instruction directs the sequencer to execute the instruction at the address formed by adding the 26-bit sign extended offset to the current instruction pointer. The execute next (.n) option directs the sequencer to execute the instruction following the BSR instruction before executing the target instruction. Note that calling the instruction following the BSR instruction causes the current Instruction Pointer+4 bytes to be put into register r1. The return address always receives a reference tag (type=00, subtype=00).

| Addressing Modes: | bsr[.n] | off26 |
|---|---|---|
| Exceptions: | none | |

JSR—Jump to Subroutine

The JSR instruction is an unconditional jump that saves the return address in register r1. The return address is defined by adding 4 bytes to the address of the JSR instruction, or by adding 8 bytes to the address of the JSR.n instruction. The instruction directs the sequencer to execute the instruction at the absolute address found in the register specified by the rs2 field of the instruction. The execute next (.n) option directs the sequencer to execute the instruction following the JSR instruction before executing the target instruction. Note that calling the instruction following the JSR instruction causes the current Instruction Pointer+4 bytes to be put into register r1. The return address always receives a reference tag (type=00, subtype=00).

| Addressing Modes: | jsr[.n] | rs2 |
|---|---|---|
| Exceptions: | none | |

BR—Unconditional Branch

The BR instruction is an unconditional branch which directs the sequencer to execute the instruction at the address formed by adding the 26-bit sign extended offset to the current instruction pointer. The execute next (.n) option directs the sequencer to execute the instruction following the unconditional branch and before executing the target instruction.

| Addressing Modes: | br[.n] | off26 |
|---|---|---|
| Exceptions: | none | |

JMP—Unconditional Jump

The JMP instruction is an unconditional jump which directs the sequencer to execute the instruction at the absolute address found in the register specified by the rs2 field of the instruction. The execute next (.n) option directs the sequencer to execute the instruction following the JMP instruction before executing the target instruction.

| Addressing Modes: | jmp[.n] | rs2 |
|---|---|---|
| Exceptions: | none | |

BCND—Conditional Branch

The BCND instruction is a conditional branch. The source 1 operand is examined to determine 2 bits of information: 1) the most significant sign bit and 2) the logical "nor-ing" of the low order source 1 operand bits. These two bits are concatenated and used as an index into the m5 field of the instruction. If the bit found by this indexing is 1, then the branch will be taken. This allows branching on conditions such as zero, negative, positive, greater than or equal zero, less than or equal zero, without preceding the branch with a compare instruction. The branch address is formed by adding the Instruction Pointer and the 16-bit offset. The execute next (.n) option directs the sequencer to execute the instruction following the BCND.n instruction before executing the target instruction.

| Addressing Modes: | bcnd[.n] | m5, rs1, off16 |
|---|---|---|
| Exceptions: | none | |

TCND—Conditional Trap

The TCND instruction is a conditional trap. The source 1 operand is examined to determine 2 bits of information: 1) the most significant sign bit and 2) the logical "nor-ing" of the low order source 1 operand bits. These two bits are concatenated and used as an index into the m5 field of the instruction as in the BCND instruction. If the bit found by this indexing is 1, then exception processing is initiated. This allows trapping on conditions such as zero, negative, positive, greater than or equal zero, less than or equal zero, without preceding the trap with a compare instruction. The next instruction to be executed is found by concatenating the 10-bit vector number with the contents of the Vector Base Register (VBR). Attempts to trap to a hardware vector will be a programming error with unpredictable results.

| Addressing Modes: | tcnd | m5, rs1, vec10 |
|---|---|---|
| Exceptions: | trap vec10 | |

BBO—Branch on Bit Clear

The BBO instruction is a conditional branch. The bit specified by the b5 field in the register specified by the rs1 field is examined. If the bit found is 0, the branch will be taken. The branch address is formed by adding the Instruction Pointer and the 16-bit offset. The execute next (.n) option directs the sequencer to execute the instruction following the BBO.n instruction before executing the target instruction.

| Addressing Modes: | bb0[.n]  b5, rs1, off16 |
|---|---|
| Exceptions: | none |

TB0—Trap on Bit Clear

The TB0 instruction is a conditional trap. The bit specified by the b5 field in the register specified by the rs1 field is examined. If the bit found is 0, exception processing will be initiated. The next instruction to be executed is found by concatenating the 10-bit vector number with the contents of the Vector Base Register (VBR). Attempts to trap to a hardware vector will be a programming error with unpredictable results.

| Addressing Modes: | tb0[.n]  b5, rs1, vec10 |
|---|---|
| Exceptions: | trap vec10 |

BB1—Branch on Bit Set

The BB1 instruction is a conditional branch. The bit specified by the b5 field in the register specified by the rs1 field is examined. If the bit found is 1, the branch will be taken. The branch address is formed by adding the Instruction Pointer and the 16-bit offset. The execute next (.n) option directs the sequencer to execute the instruction following the BB1.n instruction before executing the target instruction.

| Addressing Modes: | bb1[.n]  b5, rs1, off16 |
|---|---|
| Exceptions: | none |

TB1—Trap on Bit Set

The TB1 instruction is a conditional trap. The bit specified by the b5 field in the register specified by the rs1 field is examined. If the bit found is 1, exception processing will be initiated. The next instruction to be executed is found by concatenating the 10-bit vector number with the contents of the Vector Base Register (VBR). Attempts to trap to a hardware vector will be a programming error with unpredictable results.

| Addressing Modes: | tb1[.n]  b5, rs1, vec10 |
|---|---|
| Exceptions: | trap vec10 |

TBND—Trap on Bounds Check

The TBND instruction is a conditional trap. The contents of the register specified by the rs1 field and the source 2 operand are compared using unsigned arithmetic. If the source 2 operand is smaller, exception processing will be initiated. The next instruction to be executed is found by concatenating the 10-bit vector number with the contents of the Vector Base Register (VBR). The source 2 operand may be a 16-bit immediate value which is zero extended to a full 32 bits, or an unsigned 32-bit register value. Attempts to trap to a hardware vector will be a programming error with unpredictable results.

| Addressing Modes: | tbnd  rs1, lit16 |
|---|---|
|  | tbnd  rs1, rs2 |
| Exceptions: | bounds check |

RTE—Return From Exception

The RTE instruction causes a return from an exception instruction. The instruction causes the trap time shadow registers such as the TPSR and trap time instruction pointers to be restored into the integer pipeline. Processing resumes with the instructions referenced by these pointers.

| Addressing Modes: | rte |
|---|---|
| Exceptions: | privilege violation |

TBCND—Tagged Type Conditional Branch

The TBCND instruction is a conditional branch. The source 1 operand tag is examined to determine 3 bits of information: the two type bits (34, 35) and the ctl1 bit (36). The two type bits are concatenated and used as an index into the lower four bits of the m5 field of the instruction. If the bit found by this indexing is set, the branch will be taken. The ctl1 bit indexes the remaining bit of the m5 field. If that bit is set, the branch will also be taken. This allows branching on many combinations of tag conditions without preceding the branch with a compare instruction. The branch address is formed by adding the Instruction Pointer and the 16-bit offset. The execute next (.n) option directs the sequencer to execute the instruction following the TBCND.n instruction before executing the target instruction.

| Addressing Modes: | tbcnd[.n]  m5, rs1, off16 |
|---|---|
| Exceptions: | none |

SBCND—Tagged Subtype Conditional Branch

The SBCND instruction is a conditional branch. The source 1 operand tag is examined to determine 3 bits of information: the two subtype bits (32,33) and the ctl2 bit (37). The two subtype bits are concatenated and used as an index into the lower four bits of the m5 field of the instruction. If the bit found by this indexing is set, the branch will be taken. The ctl2 bit indexes the remaining bit of the m5 field. If that bit is set, the branch will also be taken. This allows branching on many combinations of tag conditions without preceding the branch with a compare instruction. The branch address is formed by adding the Instruction Pointer and the 16-bit offset. The execute next (.n) option directs the sequencer to execute the instruction following the SBCND.n instruction before executing the target instruction.

| Addressing Modes: | sbcnd[.n]  m5, rs1, off16 |
|---|---|
| Exceptions: | none |

CMP—Integer Comparison

The CMP instruction performs an unsigned and a signed integer tagged cell comparison. The value of the register specified by the rs2 field is subtracted from the value of the register specified by the rs1 field and a number of conditions are evaluated. The source 1 and source 2 tags are compared directly, and a number of conditions are evaluated. The results of evaluating the conditions are placed in the destination register specified by the rd field. The result of a comparison can be used to synthesize conditional branches.

The format of the result bit string from the integer compare instruction is defined as follows. Bit 2 (eq) is set if the two source operands are equal. Bit 3 (ne) is set if the two source operands are not equal. Bit 4 (gt) is set to indicate that the source 1 operand is greater than the source 2 operand using signed comparison. Bit 5 (le) is set to indicate that the source 1 operand is less than or equal to the source 2 operand using signed comparison. Bit 6 (lt) is set to indicate that the source 1 operand is less than the source 2 operand using signed comparison. Bit 7 (ge) is set to indicate that the source 1 operand is greater than or equal to the source 2 operand using signed comparison. Bit 8 (hi) is set to indicate that the source 1 operand is larger than the source 2 operand using unsigned comparison. Bit 9 (ls) is set to indicate that the source 1 operand is smaller than or equal to the source 2 operand using unsigned comparison. Bit 10 (lo) is set to indicate that the source 1 operand is smaller than the source 2 operand using unsigned comparison. Bit 11 (hs) is set to indicate that the source 1 operand is larger than or equal to the source 2 operand. Bit 12 (var12) is set to indicate that the type of one or both of the operands is type 00. Bit 13 (var2) is set to indicate that the primary type of the source 2 operand is type 00. Bit 14 (var1) is set to indicate that the primary type of the source 1 operand is type 00. Bit 15 (teq) is set to indicate that the two source operands have the same primary and secondary types. Bit 16 (tveq) is set to indicate that the two source operands have the same primary and secondary types as well as equal values.

| Addressing Modes: | cmp  | rd, rs1, rs2 |
|---|---|---|
| Exceptions: | none | |

TCMP—Tagged Integer Compare

The TCMP instruction performs an unsigned and a signed integer tagged cell comparison. The source 2 operand value is subtracted from the value of the register specified by the rs1 field and a number of conditions are evaluated. The source 2 operand value may be an unsigned 16-bit immediate value which is zero extended to a full 32 bits, or a 32-bit register value. The source 1 and source 2 tags are compared directly, and a number of conditions are evaluated. The source 2 operand tag is taken to be the immediate tag specified by the tag6 field. The results of evaluating the conditions are placed in the destination register specified by the rd field. The result format is the same as that specified for the CMP instruction. The result of a comparison can be used to synthesize conditional branches.

| Addressing Modes: | tcmp | tag6 \| rd, rs1, rs2 |
|---|---|---|
| | tcmp | tag6 \| rd, rs1, lit16 |
| Exceptions: | none | |

LD—Load Register From Memory Unscaled

The LD instruction loads a memory value into a general purpose register. The value of the register specified by the rs1 field is added to the source 2 operand to form the address for the load. The source 2 operand may be an unsigned 16-bit immediate value which is zero extended or a general purpose register index specified by the rs2 field. A memory read operation is initiated and the destination register specified by the rd field is made unavailable until the result of the memory transaction is available. When the memory transaction is completed, the result is placed in the destination register and the register is made available for use. The byte option (.b) specifies that a byte value should be loaded. The unsigned byte option (.bu) specifies that an unsigned byte value should be loaded. The halfword option (.h) specifies that a halfword value should be loaded. The unsigned halfword option specifies that an unsigned halfword value should be loaded. The double option (.d) specifies that a double word value should be loaded. The default specifies that a word value should be loaded. The U bit specifies the processor mode context to be used for the load (0=use mode bit in PSR, 1=force user mode). The TY field encodes the size of the memory access (11=byte, 10=halfword, 01=word, 00=double word). The P field encodes the sign extension mode for the memory access (01=signed, 00=unsigned).

| Addressing Modes: | ld.b   | rd, rs1, lit16 | ld.b   | rd, rs1, rs2 |
|---|---|---|---|---|
| | ld.bu  | rd, rs1, lit16 | ld.bu  | rd, rs1, rs2 |
| | ld.h   | rd, rs1, lit16 | ld.h   | rd, rs1, rs2 |
| | ld.hu  | rd, rs1, lit16 | ld.hu  | rd, rs1, rs2 |
| | ld     | rd, rs1, lit16 | ld     | rd, rs1, rs2 |
| | ld.d   | rd, rs1, lit16 | ld.d   | rd, rs1, rs2 |
| Exceptions: | Data Access Fault | | | |
| | Misaligned Access Fault | | | |

LD—Load Register From Memory Scaled

The LD instruction loads a memory value into a general purpose register. The value of the register specified by the rs1 field is added to the scaled contents of the register specified by the rs2 field. A memory read operation is initiated and the destination register specified by the rd field is made unavailable until the result of the memory transaction is available. When the memory transaction is completed, the result is placed in the destination register and the register is made available for use. The halfword option (.h) specifies that a halfword value should be loaded. The unsigned halfword option specifies that an unsigned halfword value should be loaded. The double option (.d) specifies that a double word value should be loaded. The default specifies that a word value should be loaded. The U bit specifies the processor mode context to be used for the load (0=use mode bit in PSR, 1=force user mode). The TY field encodes the size of the memory access (10=halfword, 01=word, 00=double word). The scaled forms of the byte operations are identical to the unscaled forms and are, therefore, not implemented. The P field encodes the sign extension mode for the memory access (01=signed, 00=unsigned).

| | | |
|---|---|---|
| Addressing Modes: | ld.b | rd, rs1[rs2] |
| | ld.hu | rd, rs1[rs2] |
| | ld | rd, rs1[rs2] |
| | ld.d | rd, rs1[rs2] |
| Exceptions: | Data Access Fault | |
| | Misaligned Access Fault | |

DRF—Dereference Register From Memory Unscaled

The unscaled DRF instruction places a tagged value reference by a pointer chain into a general purpose register. The value of the register specified by the rs1 field is added to the value of the source 2 operand to form an effective address. The source 2 operand value may be an unsigned 16-bit immediate which is zero extended or a general purpose register index specified by the rs2 field. The tag of the register specified by the rs1 field is examined and if it is bound (type =00, subtype =00) a memory read operation is initiated and the destination register specified by the rd field is made unavailable. When the memory transaction is completed, the fetched tag is examined and another memory operation is initiated using the fetched value if the tag is again bound. If an unbound cell is examined, the unbound tag is replaced by bound and the process terminates. When any other non-zero (not bound) tag value is examined, the process terminates leaving the tag unaffected. The resulting cell is placed in the destination register and the register is made available for use. The U bit specifies the processor mode context to be used for the memory operations (0=use mode bit in PSR, 1=force user mode).

| | | |
|---|---|---|
| Addressing Modes: | drf | rd, rs1, rs2 |
| | drf | rd, rs1, lit16 |
| Exceptions: | Data Access Fault | |
| | Misaligned Access Fault | |

DRFI—Dereference Register From Memory Unscaled Indirect

The DRFI instruction places a tagged value referenced by an indirect pointer chain into a general purpose register. The value of the register specified by the rs1 field is added to the value of the source 2 operand to form an effective address. The source 2 operand value may be an unsigned 16-bit immediate which is zero extended or the value of a general purpose register index specified by the rs2 field. A memory read operation is initiated and the destination register specified by the rd field is made unavailable. When the memory transaction is completed, the fetched tag is examined and another memory operation is initiated using the fetched value if the tag is bound. If an unbound cell is examined, the unbound tag is replaced by bound and the process terminates. When any other non-zero (not bound) tag value is fetched, the process terminates leaving the tag unaffected. The resulting cell is placed in the destination register and the register is made available for use. The U bit specifies the processor mode context to be used for the memory operations (0=use mode bit in PSR, 1=force user mode).

| | | |
|---|---|---|
| Addressing Modes: | drfi | rd, rs1, rs2 |
| | drfi | rd, rs1, lit16 |
| Exceptions: | Data Access Fault | |
| | Misaligned Access Fault | |

DRFI—Dereference Register From Memory Scaled Indirect

The scaled DRFI instruction places a tagged value referenced by an indirect pointer chain into a general purpose register. The value of the register specified by the rs1 field is added to the scaled contents of the register specified by the rs2 field to form an effective address. A memory read operation is initiated and the destination register specified by the rd field is made unavailable. When the memory transaction is completed, the fetched tag is examined and another memory operation is initiated using the fetched tag if the tag is bound. If an unbound cell is examined, the unbound tag is replaced by bound and the process terminates. When any other non-zero (not bound) tag value is fetched, the process terminates leaving the tag unaffected. The resulting cell is placed in the destination register and the register is made available for use. The U bit specifies the processor mode context to be used for the memory operations (0=use mode bit in PSR, 1=force user mode).

| | | |
|---|---|---|
| Addressing Modes: | drfi | rd, rs1[rs2] |
| Exceptions: | Data Access Fault | |
| | Misaligned Access Fault | |

ST—Store Register to Memory Unscaled

The ST instruction stores the value of a general purpose register to memory. The value of the register specified by the rs1 field is added to the source 2 operand to form the address for the store. The source 2 operand may be an unsigned 16-bit immediate value which is zero extended or a general purpose register index specified by the rs2 field. A memory write operation is initiated with the contents of the destination register specified by the rd field. The byte option (.b) specifies that a byte value should be stored. The halfword option (.h) specifies that a halfword value should be stored. The double option (.d) specifies that a double word value should be stored. The default specifies that a word value should be stored. The U bit specifies the processor mode context to be used for the store (0=use mode bit in PSR, 1=force user mode). The TY field encodes the size of the transfer (11=byte, 10=half word, 01=word, 00=double word).

| | | | | |
|---|---|---|---|---|
| Addressing Modes: | st.b | rd, rs1, lit16 | st.b | rd, rs1, rs2 |
| | st.h | rd, rs1, lit16 | st.h | rd, rs1, rs2 |
| | st | rd, rs1, lit16 | st | rd, rs1, rs2 |
| | st.d | rd, rs1, lit16 | st.d | rd, rs1, rs2 |
| Exceptions: | Data Access Fault | | | |
| | Misaligned Access Fault | | | |

ST—Store Register To Memory Scaled

The ST instruction stores the value of a general purpose register to memory. The value of the register specified by the rs1 field is added to the scaled contents of the register specified by the rs2 field. A memory write operation is initiated with the contents of the destination register specified by the rd field. The halfword option (.h) specifies that a halfword value should be stored. The double option (.d) specifies that a double word value should be stored. The default specifies that a word value should be stored. The U bit specifies the processor mode context to be used for the store (0=use mode bit in PSR, 1=force user mode). The TY field encodes the size of the transfer (10=half word, 01=word, 00=double word). The scaled form of the byte operation is identical to the unscaled form and is, therefore, not implemented.

| Addressing Modes: | st.h | rd, rs1[rs2] |
|---|---|---|
| | st | rd, rs1[rs2] |
| | st.d | rd, rs1[rs2] |
| Exceptions: | Data Access Fault | |
| | Misaligned Access Fault | |

TST—Tagged Store Register To Memory Unscaled

The TST instruction stores a register value and immediate tag to memory. The value of the register specified by the rs1 field is added to the source 2 operand to form the address for the store. The source 2 operand may be an unsigned 16-bit immediate value which is zero extended or a general purpose register index specified by the rs2 field. A memory write operation is initiated with the value of the destination register specified by the rd field and the immediate tag specified by the tag6 field. The U bit specifies the processor mode context to be used for the store (0=use mode bit in PSR, 1=force user mode).

| Addressing Modes: | tst | tag6 | rd, rs1, rs2 |
|---|---|---|---|
| | tst | tag6 | rd, rs1, lit16 |
| Exceptions: | Data Access Fault | | |
| | Misaligned Access Fault | | |

TST—Tagged Store Register To Memory Scaled

The TST instruction stores a value and an immediate tag to memory. The value of the register specified by the rs1 field is added to the scaled contents of the register specified by the rs2 field to form the address for the store. The source 2 operand value may be an unsigned 16-bit immediate value which is zero extended or a general purpose register index specified by the rs2 field. A memory write operation is initiated with the value of the destination register specified by the rd field and the immediate tag specified by the tag6 field. The U bit specifies the processor mode context to be used for the store (0=use mode bit in PSR, 1=force user mode).

| Addressing Modes: | tst | tag6 | rd, rs1[rs2] |
|---|---|---|---|
| Exceptions: | Data Access Fault | | |
| | Misaligned Access Fault | | |

BIND—Tagged Bind Register To Memory

The tagged BIND instruction stores an immediate tag and value to memory. The value of the register specified by the rsd field is taken as the effective address for the store. The source 2 operand is an unsigned 16-bit immediate value which is zero extended. A memory write operation is initiated with the value of the source 2 operand and the immediate tag specified by the tag6 field. The U bit specifies the processor mode context to be used for the store (0=use mode bit in PSR, 1=force user mode).

| Addressing Modes: | bind | tag6 | lit16, rsd |
|---|---|---|---|
| Exceptions: | Data Access Fault | | |
| | Misaligned Access Fault | | |

PUSH—Push Value To Memory

The PUSH instruction stores the contents of a general purpose register to memory and increments the pointer to the memory word. The value of the register specified by the rsd field is taken as the effective address for the store. A memory write operation is initiated with the contents of the register specified by the rs2 field. The value of the register specified by rsd field is incremented by one word while retaining the tag, creating a tagged pointer to the next value of a memory area operated as a stack. The U bit specifies the processor mode context to be used for the store (0=use mode bit in PSR, 1=force user mode).

| Addressing Modes: | push | rs2, rsd |
|---|---|---|
| Exceptions: | Data Access Fault | |
| | Misaligned Access Fault | |

PUSH—Tagged Push Value To Memory

The tagged PUSH instruction stores a tagged value to memory and increments the pointer to the memory word. The value of the register specified by the rsd field is taken as the effective address for the store. The source 2 operand value may be an unsigned 16-bit immediate value which is zero extended or the value of a general purpose register specified by the rs2 field. A memory write operation is initiated with the source 2 operand and the immediate tag specified by the tag6 field. The value of the register specified by rsd field is incremented by one word while retaining the tag, creating a tagged pointer to the next value of a memory area operated as a stack. The U bit specifies the processor mode context to be used for the store (0=use mode bit in PSR, 1=force user mode).

| Addressing Modes: | push | tag6 | rs2, rsd |
|---|---|---|---|
| | push | tag6 | lit16, rsd |
| Exceptions: | Data Access Fault | | |
| | Misaligned Access Fault | | |

PULL—Pull Value From Memory

The PULL instruction decrements a pointer and loads a memory value into a general purpose register. The value of the register specified by the rsd field is decremented and used as the effective address for the load. A memory read operation is initiated with the destination specified by the rd field. The value of the register specified by rsd field is decremented by one word while retaining the tag, creating a tagged pointer to the top of a memory area operated as a stack. The U bit specifies the processor mode context to be used for the load (0=use mode bit in PSR, 1=force user mode).

| Addressing Modes: | pull | rd, rsd |
|---|---|---|

-continued

| Exceptions: | Data Access Fault |
| --- | --- |
| | Misaligned Access Fault |

XMEM—Exchange Register With Memory Unscaled

The XMEM instruction exchanges a general purpose register and a memory value. The value of the register specified by the rs1 field is added to the source 2 operand to form the address for the exchange. The source 2 operand may be an unsigned 16-bit immediate value which is zero extended or a general purpose register index specified by the rs2 field. A memory read operation is initiated and the destination register specified by the rd field is made unavailable until the result of the memory transaction is available. If a zero is loaded, a memory write operation is initiated with the contents of the register specified by the rsd field, and the register is overwritten with the value loaded. The load and store accesses are indivisible and cannot be interrupted by external interrupts, bus arbitration, or imprecise exceptions. The byte option (.b) specifies that byte values should be exchanged. The U bit specifies the processor mode context to be used for the exchange (0=use mode bit in PSR, 1=force user mode). The TY field encodes the size for the exchange (01=word, 00=byte).

| Addressing Modes: | xmem rd, rs1, lit16 | xmem rd, rs1, rs2 |
| --- | --- | --- |
| | xmem.b rd, rs1, lit16 | xmem.b rd, rs1, rs2 |
| Exceptions: | Data Access Fault | |
| | Misaligned Access Fault | |

XMEM—Exchange Register With Memory Scaled

The XMEM instruction exchanges a general purpose and a memory value. The value of the register specified by the rs1 field is added to the scaled contents of the register specified by the rs2 field to form the address for the exchange. A memory read operation is initiated and the destination register specified by the rd field is made unavailable until the result of the memory transaction is available. If a zero is loaded, a memory write operation is initiated with the contents of the register specified by the rsd field, and the register is overwritten with the value loaded. The load and store accesses are indivisible and cannot be interrupted by external interrupts, bus arbitration, or imprecise exceptions. The U bit specifies the processor mode context to be used for the exchange (0=use mode bit in PSR, 1=force user mode).

| Addressing Modes: | xmem rd, rs1[rs2] |
| --- | --- |
| Exceptions: | Data Access Fault |
| | Misaligned Access Fault |

LDCR—Load Control Register

The LDCR instruction loads a control register into a general purpose register. The control register specified by the crs field is loaded into the destination register specified by the rd field.

| Addressing Modes: | ldcr rd, crs |
| --- | --- |
| Exceptions: | Privilege Violation |

STCR—Store Control Register

The STCR instruction stores a general purpose register into a control register. The general purpose register specified by the rs field is stored to the control register specified by the crd field.

| Addressing Modes: | stcr rs, crd |
| --- | --- |
| Exceptions: | Privilege Violation |

XCR—Exchange Control Register

The XCR instruction exchanges general purpose registers and control registers. The general purpose register specified by the rs1 field is stored into the control register specified by the crs/d field while the control register is loaded into the general purpose register specified by the rd field.

| Addressing Modes: | xcr rd, rs1, crs/d |
| --- | --- |
| Exceptions: | Privilege Violation |

FADD—Floating Point Add

The FADD instruction performs a floating point addition. The values of the source 1 and source 2 operands specified by the rs1 and rs2 fields are checked for reserved operands and then added using the rules of IEEE floating point arithmetic. If an inappropriate tag value is encountered when the FOP bit in the Floating Point Control Register is set, a Floating Point Operand Exception is taken. The result of the addition is placed in the destination specified by the rd field along with the appropriate tag value (single or double). Any combination of single and double precision operands can be specified by the operand size options. The T1 field specifies the size of the source 1 operand. The T2 field specifies the size of the source 2 operand. The TD field specifies the size of the destination operand.

| Addressing Modes: | fadd.sss rd, rs1, rs2 | fadd.dss rd, rs1, rs2 |
| --- | --- | --- |
| | fadd.ssd rd, rs1, rs2 | fadd.dsd rd, rs1, rs2 |
| | fadd.sds rd, rs1, rs2 | fadd.dds rd, rs1, rs2 |
| | fadd.sdd rd, rs1, rs2 | fadd.ddd rd, rs1, rs2 |
| Exceptions: | Invalid Operation | |
| | Floating Point Overflow | |
| | Floating Point Underflow | |
| | Floating Point Operand | |
| | Inexact | |

FSUB—Floating Point Subtract

The FSUB instruction performs a floating point subtraction. The values of the source 1 and source 2 operands specified by the rs1 and rs2 fields are checked for reserved operands. If an inappropriate tag value is encountered when the FOP bit in the Floating Point Control Register is set, a Floating Point Operand Exception is taken. Then, the source 2 operand is subtracted from the source 1 operand using the rules of IEEE floating point arithmetic. The result of the subtraction is placed in the destination specified by the rd field along with the appropriate tag value (single or double). Any combination of single and double precision operands can be specified by the operand size options. The T1 field specifies the size of the source 1 operand. The T2 field specifies the size of the source 2 operand. The TD field specifies the size of the destination operand.

| Addressing Modes: | fsub.sss | rd, rs1, rs2 | fsub.dss | rd, rs1, rs2 |
|---|---|---|---|---|
| | fsub.ssd | rd, rs1, rs2 | fsub.dsd | rd, rs1, rs2 |
| | fsub.sds | rd, rs1, rs2 | fsub.dds | rd, rs1, rs2 |
| | fsub.sdd | rd, rs1, rs2 | fsub.ddd | rd, rs1, rs2 |
| Exceptions: | Invalid Operation | | | |
| | Floating Point Overflow | | | |
| | Floating Point Underflow | | | |
| | Floating Point Operand | | | |
| | Inexact | | | |

FDIV—Floating Point Divide

The FDIV instruction performs a floating point division. The values of the source 1 and source 2 operands specified by the rs1 and rs2 fields are checked for reserved operands. If an inappropriate tag value is encountered when the FOP bit in the Floating Point Control Register is set, a Floating Point Operand Exception is taken. Then, the source 2 operand is divided by the source 1 operand using the rules of IEEE floating point arithmetic. The result of the division is placed in the destination specified by the rd field along with the appropriate tag value (single or double). Any combination of single and double precision operands can be specified by the operand size options. The T1 field specifies the size of the source 1 operand. The T2 field specifies the size of the source 2 operand. The TD field specifies the size of the destination operand.

| Addressing Modes: | fdiv.sss | rd, rs1, rs2 | fdiv.dss | rd, rs1, rs2 |
|---|---|---|---|---|
| | fdiv.ssd | rd, rs1, rs2 | fdiv.dsd | rd, rs1, rs2 |
| | fdiv.sds | rd, rs1, rs2 | fdiv.dds | rd, rs1, rs2 |
| | fdiv.sdd | rd, rs1, rs2 | fdiv.ddd | rd, rs1, rs2 |
| Exceptions: | Invalid Operation | | | |
| | Floating Point Overflow | | | |
| | Floating Point Underflow | | | |
| | Floating Point Operand | | | |
| | Inexact | | | |

FMUL—Floating Point Multiply

The FMUL instruction performs a floating point multiplication. The values of the source 1 and source 2 operands specified by the rs1 and rs2 fields are checked for reserved operands and then multiplied using the rules of IEEE floating point arithmetic. If an inappropriate tag value is encountered when the FOP bit in the Floating Point Control Register is set, a Floating Point Operand Exception is taken. The result of the multiplication is placed in the destination specified by the rd field along with the appropriate tag value (single or double). Any combination of single and double precision operands can be specified by the operand size options. The T1 field specifies the size of the source 1 operand. The T2 field specifies the size of the source 2 operand. The TD field specifies the size of the destination operand.

| Addressing Modes: | fmul.sss | rd, rs1, rs2 | fmul.sds | rd, rs1, rs2 |
|---|---|---|---|---|
| | fmul.dss | rd, rs1, rs2 | fmul.dds | rd, rs1, rs2 |
| | fmul.ssd | rd, rs1, rs2 | fmul.sdd | rd, rs1, rs2 |
| | fmul.dsd | rd, rs1, rs2 | fmul.ddd | rd, rs1, rs2 |
| Exceptions: | Invalid Operation | | | |
| | Floating Point Overflow | | | |
| | Floating Point Underflow | | | |
| | Floating Point Operand | | | |
| | Inexact | | | |

FCMP—Floating Point Compare

The FCMP instruction performs a floating point comparison. The values of the source 1 and source 2 operands specified by the rs1 and rs2 fields are checked for reserved operands. If an inappropriate tag value is encountered when the FOP bit in the Floating Point Control Register is set, a Floating Point Operand Exception is taken. Then, the source 2 operand is subtracted from the source 1 operand using the rules of IEEE floating point arithmetic. The result of the subtraction is discarded but is used to evaluate a number of conditions that are placed in the destination specified by the rd field. Any combination of single and double precision source operands can be specified by the operand size options. The result conditions can be used to synthesize conditional branch comparisons. The T1 field specifies the size of the source 1 operand. The T2 field specifies the size of the source 2 operand. The TD field specifies the size of the destination operand.

The result format for the floating point compare instruction is defined as follows. Bit 0 (nc) is set to indicate that the two operands are of different types and are not comparable. Bit 1 (cp) is set to indicate that the two source operands are comparable. Bit 2 (eq) is set if the two source operands are equal. Bit 3 (eq) is set if the two source operands are not equal. Bit 4 (gt) is set to indicate that the source 1 operand is greater than the source 2 operand. Bit 5 (le) is set to indicate that the source 1 operand is less than or equal to the source 2 operand. Bit 6 (lt) is set to indicate that the source 1 operand is less than the source 2 operand. Bit 7 (ge) is set to indicate that the source 1 operand is greater than or equal to the source 2 operand. Bits 8–11 are set to indicate a relationship between the value of the source 1 operand (S1) and the range of values between zero and the value of the source 2 operand (S2). Bit 8 (hi) is set to indicate that the source 1 operand (S1) is outside the range of values (0>S1>S2). Bit 9 (ls) is set to indicate that the source 1 operand is inside or on the boundary of the range (0<=S1<=S2). Bit 10 (lo) is set to indicate that the source 1 operand is inside the range of values (0<S1<S2). Bit 11 (hs) is set to indicate that the source 1 operand is outside or on the boundary of the range of values (0=>S1=>S2).

| Addressing Modes: | fcmp.ss | rd, rs1, rs2 |
|---|---|---|
| | fcmp.sd | rd, rs1, rs2 |
| | fcmp.ds | rd, rs1, rs2 |
| | fcmp.dd | rd, rs1, rs2 |
| Exceptions: | Floating Point Operand | |
| | Invalid Operation | |

NINT—Floating Point Round To Integer

The NINT instruction rounds a floating point number to an integer. The value of the source 2 operand specified by the rs2 field is rounded to an integer representation using the IEEE round to nearest rounding mode. If an inappropriate tag value is encountered when the FOP bit in the Floating Point Control Register is set, a Floating Point Operand Exception is taken. The result of the operation is placed in the destination specified by the rd field along with an integer tag (type=01, subtype=01). The source operand may be either single or double precision as specified by the operand size option. The T2 field specifies the size of the source operand.

| Addressing Modes: | nint.s rd, rs2 |
| --- | --- |
|  | nint.d rd,rs1 |
| Exceptions: | Invalid Operation |
|  | Floating Point Operand |

INT—Floating Point Current Rounding Mode To Integer

The INT instruction rounds a floating point number to an integer. The value of the source 2 operand specified by the rs2 field is rounded to an integer representation using the current rounding mode as specified in the user floating point status register. If an inappropriate tag value is encountered when the FOP bit in the Floating Point Control Register is set, a Floating Point Operand Exception is taken. The result of the operation is placed in the destination specified by the rd field along with an integer tag (type=01, subtype=01). The source operand may be either single or double precision as specified by the operand size option. The TD field specifies the size of the source operand.

| Addressing Modes: | int.s rd, rs2 |
| --- | --- |
|  | int.d rd, rs2 |
| Exceptions: | Invalid Operation |
|  | Floating Point Operand |

TRNC—Floating Point Truncate To Integer

The TRNC instruction truncates a floating point number. The value of the source 2 operand specified by the rs2 field is truncated to an integer representation using the IEEE round to zero rounding mode. If an inappropriate tag value is encountered when the FOP bit in the Floating Point Control Register is set, a Floating Point Operand Exception is taken. The result of the operation is placed in the destination specified by the rd field along with an integer tag (type=01, subtype=01). The source operand may be either single or double precision as specified by the operand size option. The T2 field encodes the size of the source operand.

| Addressing Modes: | trnc.s rd, rs2 |
| --- | --- |
|  | trnc.d rd, rs2 |
| Exceptions: | Invalid Operation |
|  | Floating Point Operand |

FLT—Convert Integer To Floating Point

The FLT instruction converts an integer to its floating point representation. The integer value of the source 2 register specified by the rs2 field is checked and converted to floating point representation. If an inappropriate tag value is encountered when the FOP bit in the Floating Point Control Register is set, a Floating Point Operand Exception is taken. The result of the operation is placed in the destination specified by the rd field along with the appropriate tag value (single or double). The destination operand may be either single or double precision as specified by the operand size option. The TD field encodes the size of the destination operand.

| Addressing Modes: | flt.s rd, rs2 |
| --- | --- |
|  | flt.d rd, rs2 |
| Exceptions: | Inexact |
|  | Floating Point Operand |

FLDCR—Floating Point Load From Control Register

The FLDCR instruction loads a floating point control register into a general purpose register. The control register specified by the crs field is loaded into the destination register specified by the rd field.

| Addressing Modes: | fldcr rd, crs |
| --- | --- |
| Exceptions: | Privilege Violation |

FSTCR—Floating Point Store To Control Register

The FSTCR instruction stores a general purpose register into a floating point control register. The general purpose register specified by the rs1 field is stored to the control register specified by the crd field.

| Addressing Modes: | fstcr rs, crd |
| --- | --- |
| Exceptions: | Privilege Violation |

FXCR—Floating Point Exchange Control Register

The FXCR instruction exchanges general purpose registers and floating point control registers. The general purpose register specified by the rs1 field is stored to the control register specified by the crs/d field while the control register is loaded into the general purpose register specified by the rd field.

| Addressing Modes: | fxcr rd, rs1, crs/d |
| --- | --- |
| Exceptions: | Privilege Violation |

GADD—Generic Add

The GADD instruction performs a generic addition. The tags of the source 1 and source 2 operands specified by the rs1 and rs2 fields are checked and the values are added as appropriate if possible. If both operands are integer, a signed integer addition is performed, producing an integer result. If both are single precision floating point, they are added producing a single precision result. If an integer and a single precision floating point operand are supplied, the integer is converted to floating point format and added, producing a single precision result. The result of the addition is placed in the destination specified by the rd field with the appropriate tag (type 01 subtype 01, or type 01 subtype 10).

| Addressing Modes: | gadd rd, rs1, rs2 |
| --- | --- |
| Exceptions: | Generic Arithmetic Operand |
|  | Invalid Operation |
|  | Floating Point Overflow |
|  | Floating Point Underflow |
|  | Inexact |

GSUB—Generic Subtract

The GSUB instruction performs a generic subtraction. The tags of the source 1 and source 2 operands specified by the rs1 and rs2 fields are checked and the values are subtracted as appropriate if possible. If both operands are integer, a signed integer subtraction is performed, producing an integer result. If both are single precision floating point, they are subtracted producing a single precision result. If an integer and a single precision floating point operand are supplied, the integer is converted to floating point format and subtracted, producing a single precision result. The result of the subtraction is placed in the destination specified by the rd field with the appropriate tag (type 01 subtype 01, or type 01 subtype 10).

| Addressing Modes: | gsub rd, rs1, rs2 |
|---|---|
| Exceptions: | Generic Arithmetic Operand |
| | Invalid Operation |
| | Floating Point Overflow |
| | Floating Point Underflow |
| | Inexact |

GCMP—Generic Compare

The GCMP instruction performs a generic comparison. The tags of the source 1 and source 2 operands specified by the rs1 and rs2 fields are checked and the values are subtracted as appropriate if possible, producing a result bit string. The source 1 and source 2 tags are compared directly, and a number of conditions are evaluated. The results of evaluating the conditions are placed in the destination register specified by the rd field. The result string is the same as that specified for the fcmp instruction. The result of a comparison can be used to synthesize conditional branches.

| Addressing Modes: | gcmp rd, rs1, rs2 |
|---|---|
| Exceptions: | Generic Arithmetic Operand |
| | Invalid Operation |

GDIV—Generic Divide

The GDIV instruction performs a generic division. The tags of the source 1 and source 2 operands specified by the rs1 and rs2 fields are checked and the values are divided as appropriate if possible. If both operands are integer, a signed integer division is performed, producing an integer result. If both are single precision floating point, they are divided producing a single precision result. If an integer and a single precision floating point operand are supplied, the integer is converted to floating point format and divided, producing a single precision result. The result of the division is placed in the destination specified by the rd field with the appropriate tag (type 01 subtype 01, or type 01 subtype 10).

| Addressing Modes: | gdiv rd, rs1, rs2 |
|---|---|
| Exceptions: | Generic Arithmetic Operand |
| | Invalid Operation |
| | Floating Point Overflow |
| | Floating Point Underflow |
| | Inexact |

GMUL—Generic Multiply

The GMUL instruction performs a generic multiplication. The tags of the source 1 and source 2 operands specified by the rs1 and rs2 fields are checked and the values are multiplied as appropriate if possible. If both operands are integer, an integer multiplication is performed, producing an integer result. If both are single precision floating point, they are multiplied producing a single precision result. If an integer and a single precision floating point operand are supplied, the integer is converted to floating point format and multiplied, producing a single precision result. The result of the addition is placed in the destination specified by the rd field with the appropriate tag (type 01 subtype 01, or type 01 subtype 10).

| Addressing Modes: | gmul rd, rs1, rs2 |
|---|---|
| Exceptions: | Generic Arithmetic Operand |
| | Invalid Operation |
| | Floating Point Overflow |
| | Floating Point Underflow |
| | Inexact |

I claim:

1. A microprocessor, comprising:

a register file having a bi-directional port and first and second outputs and including a plurality of registers for storing data words therein, said data words including a full precision data portion and a tag field for identifying the data type thereof, wherein said first output provides separate data portion and tag field of a first data word and said second output provides a separate data portion and tag field of a second data word;

first computing means having first and second inputs respectively coupled to said first and second outputs of said register file for performing arithmetic computation on said data portions of said first and second data words and providing a resulting data word having a data portion at a first output which is applied at said bi-directional port of said register file;

a memory for storing a plurality of instruction words each having a full precision instruction portion and a tag field;

an instruction register coupled to said memory for receiving an instruction word; and selector means for selecting between said tag field of said instruction word applied at a first input and said tag field of said first data word applied at a second input under control of predetermined bits from said tag field of said instruction word and providing at an output one of said tag fields applied at said first and second inputs, wherein said tag field provided at said output is applied at said bi-directional port of said register file and combined with said data portion of said resulting data word of said first computing means for storage into said register file.

2. The microprocessor of claim 1 further comprising second computing means responsive to said data portion and tag field of said first data word and said data portion and tag field of said second data word for performing floating point computation thereon and providing a resulting data word having a data portion and tag field at an output for storage into said register file.

3. The microprocessor of claim 2 wherein said first computing means further comprises a second output for providing an address word in response to instruction dependent computation of said data portions of said first and second data words.

4. The microprocessor of claim 3 further comprising a program counter coupled to said second output of said first computing means for storing said address word as a pointer to a memory location containing the next executable instruction.

5. The microprocessor of claim 1 wherein said tag field includes a first plurality of bits reserved for identifying said data type.

6. The microprocessor of claim 5 wherein said tag field further includes a second plurality of bits for instruction dependent control and a third plurality of bits reserved in the instruction word for selecting between the tag field of the instruction word and the tag field of one operand to provide the tag field for the data word resulting from instruction dependent computation of the operands.

7. The microprocessor architecture of claim 6 wherein said first plurality of bits reserved for identifying the data type includes:
   at least two bits for identifying one of a plurality of primary categories of data types; and
   at least two bits for identifying one of a plurality of subtype categories within each of said plurality of primary categories of data types.

8. The microprocessor architecture of claim 7 wherein said second plurality of bits for instruction dependent control includes at least first and second bits, wherein said first and second bits are set and tested independently for control of program execution branching based on the results thereof.

9. A method of executing an instruction on a reduced instruction set computer having a multi-bit extension appended to the data and instruction registers, wherein the multi-bit extension includes a tag field for identifying the data type of the data words process therethrough, comprising the steps of:
   storing in a memory a plurality of instruction words each having a full precision instruction portion and a multi-bit extension having a tag field;
   retrieving an instruction word from said memory;
   storing said instruction word in an instruction register coupled to said memory;
   retrieving a first data word having a data portion and a tag field from a first data register and applying said data portion to the first input of an arithmetic logic unit;
   retrieving a second data word having a data portion from a second data register or from said instruction register and applying said data portion to the second input of said arithmetic logic unit;
   performing a computation on said data portions of said first and second data words as determined by said full precision instruction portion of said instruction word and providing a resulting data word;
   selecting between said tag field of said first data word and said tag field of said instruction word as determined by a control signal in said tag field of said instruction word; and
   combining said resulting data word of the computation with said selected tag field for storage in a third data register.

10. An integrated microprocessor having a reduced instruction set computer architecture, comprising:
   first means having a bi-directional port and first and second outputs and including a plurality of registers for storing data words therein, said data words including a full precision data portion and a tag field for identifying the data type thereof, wherein said first output provides a separate data portion and tag field of a first data word and said second output provides a separate data portion and tag field of a second data word;
   second means having first and second inputs respectively coupled to said first and second outputs of said first means for performing arithmetic computation on said data portions of said first and second data words and providing a resulting data word having a data portion at a first output which is applied at said bi-directional port of said first means;
   third means for storing a plurality of instruction words each having a full precision instruction portion and a tag field;
   fourth means coupled to said third means for receiving an instruction word; and
   fifth means for selecting between said tag field of said instruction word applied at a first input and said tag field of said first data word applied at a second input under control of predetermined bits from said tag field of said instruction word and providing at an output one of said tag fields applied at said first and second inputs, wherein said tag field provided at said output is applied at said bi-directional port of said first means and combined with said data portion of said resulting data word of said second means for storage into said first means.

11. The microprocessor of claim 10 further comprising fifth means responsive to said data portion and tag field of said first data word and said data portion and tag field of said second data word for performing floating point computation thereon and providing a resulting data word having a data portion and tag field at an output for storage into said first means.

12. The microprocessor of claim 11 wherein said second means further comprises a second output for providing an address word in response to instruction dependent computation of said data portions of said first and second data words.

13. The microprocessor of claim 12 further comprising a program counter coupled to said second output of said second means for storing said address word as a pointer to a memory location containing the next executable instruction.

* * * * *